(12) United States Patent
Kondo

(10) Patent No.: US 10,995,831 B2
(45) Date of Patent: May 4, 2021

(54) LENS BARREL AND CAM FOLLOWER

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/805,013

(22) Filed: Feb. 28, 2020

(65) Prior Publication Data
US 2020/0200240 A1 Jun. 25, 2020

Related U.S. Application Data

(63) Continuation of application No. PCT/JP2018/024650, filed on Jun. 28, 2018.

(30) Foreign Application Priority Data

Aug. 31, 2017 (JP) .............................. JP2017-167653

(51) Int. Cl.
*G02B 7/02* (2021.01)
*G02B 7/10* (2021.01)
(Continued)

(52) U.S. Cl.
CPC ............. *F16H 25/06* (2013.01); *G02B 7/021* (2013.01); *G02B 7/10* (2013.01); *G02B 9/60* (2013.01)

(58) Field of Classification Search
CPC .......... G02B 7/02; G02B 7/021; G02B 7/022; G02B 7/023; G02B 7/026; G02B 7/10;
(Continued)

(56) References Cited

U.S. PATENT DOCUMENTS

| 6,373,641 B2 * | 4/2002 | Koiwai | ................... G02B 7/10 359/694 |
| 2009/0052069 A1 * | 2/2009 | Kaneko | .................. G02B 7/102 359/823 |
| 2015/0177476 A1 | 6/2015 | Kudoh | |

FOREIGN PATENT DOCUMENTS

| CN | 104749737 A | 7/2015 |
| JP | 4-107405 A | 4/1992 |

(Continued)

OTHER PUBLICATIONS

International Search Report (PCT/ISA/210) issued in PCT/JP2018/024650, dated Oct. 2, 2018.
(Continued)

*Primary Examiner* — William R Alexander
*Assistant Examiner* — Ephrem Z Mebrahtu
(74) *Attorney, Agent, or Firm* — Birch, Stewart, Kolasch & Birch, LLP

(57) ABSTRACT

A lens barrel includes a stationary barrel, a rotary barrel, and a movable barrel. The movable barrel includes a cam follower fitted to a straight groove in the stationary barrel and a cam groove in the rotary barrel. The surface of the cam follower to be in contact with the inner wall surface of the cam groove and the surface of the cam follower to be in contact with the inner wall surface of the straight groove have an arc shape convex toward the outside, and the cam follower is in point contact with the inner wall surfaces of the cam groove and the straight groove. The cam follower includes a first slit that is cut in from the distal end toward a proximal end thereof in parallel to an axis and a second slitcut in from an outer peripheral portion of the cam follower toward an inner peripheral portion.

11 Claims, 25 Drawing Sheets

(51) Int. Cl.
*G02B 9/60* (2006.01)
*F16H 25/06* (2006.01)

(58) Field of Classification Search
CPC ........ G02B 7/105; G02B 7/04; H04N 5/2251;
H04N 5/2254; G03B 3/02
See application file for complete search history.

(56) References Cited

FOREIGN PATENT DOCUMENTS

| JP | 5-14255 Y2 | 4/1993 | |
|---|---|---|---|
| JP | 2009-198625 A | 9/2009 | |
| JP | 2010-282020 A | 12/2010 | |
| JP | 2012-203196 A | 10/2012 | |
| WO | WO 2012/132780 A1 | 10/2012 | |
| WO | WO-2012132780 A1 * | 10/2012 | ............... G03B 3/02 |

OTHER PUBLICATIONS

Written Opinion (PCT/ISA/237) issued in PCT/JP2018/024650, dated Oct. 2, 2018.
Chinese Office Action and Search Report, dated Jun. 9, 2020, for Chinese Application No. 201880055901.7, with English translations.

* cited by examiner

LENS BARREL AND CAM FOLLOWER

CROSS-REFERENCE TO RELATED APPLICATIONS

The present application is a Continuation of PCT International Application No. PCT/JP2018/024650 filed on Jun. 28, 2018 claiming priority under 35 U.S.C § 119(a) to Japanese Patent Application No. 2017-167653 filed on Aug. 31, 2017. Each of the above applications is hereby expressly incorporated by reference, in their entirety, into the present application.

BACKGROUND OF THE INVENTION

1. Field of the Invention

The present invention relates to a lens barrel and a cam follower.

2. Description of the Related Art

Some or all of component lenses of lens devices used for a camera, a projector, and the like are moved along an optical axis, so that focusing, zooming, and the like are performed.

A cam mechanism is known as one of mechanisms for moving the lenses along the optical axis. Generally, a lens barrel includes movable barrels, a stationary barrel, and a rotary barrel in the cam mechanism. The movable barrels are lens barrels holding the lenses to be moved, and cam followers are provided on the outer periphery of the movable barrels. The cam followers are fitted to straight grooves provided in the stationary barrel and cam grooves provided in the rotary barrel. In a case where the rotary barrel is rotated relative to the stationary barrel, the movable barrels of the lens barrel having this structure are moved back and forth along the optical axis (for example, JP1992-107405A (JP-H04-107405A) and the like).

However, the cam mechanism has a problem that the shift, tilt, and the like of the optical axis occur in a case where backlash occurs between the cam follower and each groove.

A method of allowing a cam follower to be elastically deformable in a radial direction and making the cam follower be in pressure contact with the inner wall surface of each groove is known as a method of solving this problem. Further, a structure where slits are cut in from the distal end of a cam follower in parallel to an axis is known as a structure that allows the cam follower to be elastically deformable in the radial direction (for example, JP2010-282020A, JP2009-198625A, and the like).

SUMMARY OF THE INVENTION

However, in a case where one cam follower is to be fitted to two grooves of a straight groove and a cam groove and the cam follower is adapted to be elastically deformable in the radial direction by slits, there is a problem that the deformation of the fitting portion to be fitted to one groove affects the fitting portion to be fitted to the other groove. Specifically, for example, in a case where a fitting portion close to a distal end is pressed against the inner wall surface of the groove and is deformed inward, there is a problem that a fitting portion close to a proximal end expands outward due to the influence of the deformation of the fitting portion and the contact pressure of the fitting portion with the groove is changed. For this reason, in a case where both the two grooves and the cam follower are not machined with high accuracy, there is a drawback that the cam follower cannot be in contact with each groove with proper contact pressure.

Further, in a case where the cam follower is adapted to be mounted on the movable barrel by press-fitting and the cam follower is adapted to be elastically deformable by slits, the influence of elastic deformation also affects a press-fitting portion to be fitted to the movable barrel. For this reason, there is also a drawback that the accuracy of the mounting of the cam follower on the movable barrel is lowered.

The invention has been made in consideration of the above-mentioned circumstances, and an object of the invention is to provide a lens barrel and a cam follower that can appropriately prevent the occurrence of backlash and can be smoothly operated while relaxing the requirements for machining accuracy.

Means for solving the above-mentioned problems are as follows.

(1) A lens barrel comprises a first barrel including a cam groove, a second barrel including a straight groove, a movable barrel that is disposed in the first barrel and the second barrel, and a cam follower which is provided on the movable barrel and has a hollow shape and of which a distal end to be fitted to the straight groove and the cam groove is open. The movable barrel is moved along an optical axis by relative rotation of the first barrel and the second barrel, the cam follower includes a press-fitting portion that is provided at a proximal end portion thereof and is to be press-fitted to a protruding portion or a recessed portion provided on the movable barrel, a surface of the cam follower to be in contact with an inner wall surface of the cam groove and a surface of the cam follower to be in contact with an inner wall surface of the straight groove have an arc shape convex toward an outside, and the cam follower includes a first slit that is cut in from the distal end toward a proximal end thereof in parallel to an axis and a second slit that is cut in from an outer peripheral portion of the cam follower toward an inner peripheral portion thereof so as to be orthogonal to the axis. The second slit is disposed at a position that is closer to the proximal end than a portion of the cam follower to be in contact with the inner wall surface of the cam groove and a portion of the cam follower to be in contact with the inner wall surface of the straight groove and is closer to the distal end than the press-fitting portion, and penetrates the inner peripheral portion.

According to this aspect, a lens is moved along the optical axis by a so-called cam mechanism. The lens to be moved is held by the movable barrel. The movable barrel is provided with the cam follower. The cam follower is fitted to the cam groove of the first barrel and the straight groove of the second barrel. Accordingly, in a case where the first barrel and the second barrel are rotated relative to each other, the movable barrel is moved along the optical axis.

The cam follower includes an open distal end and has a hollow shape. The cam follower includes the press-fitting portion provided at the proximal end portion thereof and is mounted on the movable barrel through the press-fitting portion. Specifically, the press-fitting portion is press-fitted to a protruding portion or a recessed portion provided on the movable barrel, so that the cam follower is mounted on the movable barrel.

Further, the surface of the cam follower to be in contact with the inner wall surface of the cam groove and the surface of the cam follower to be in contact with the inner wall surface of the straight groove have an arc shape convex toward an outside. Accordingly, the cam follower is in point contact with the inner wall surfaces of the cam groove and the straight groove, or is in contact with the inner wall surfaces of the cam groove and the straight groove in a state close to point contact. Therefore, the elasticity of the cam follower can be used efficiently. In addition, since the sliding resistance against the inner wall surface of each groove can be reduced, the cam follower can be smoothly operated. Moreover, the attitude of the movable barrel can also be stabilized.

Furthermore, the cam follower includes the first slit and the second slit. The first slit is cut in from the distal end of the cam follower toward the proximal end thereof in parallel to the axis. On the other hand, the second slit is cut in from the outer peripheral portion of the cam follower toward the inner peripheral portion thereof so as to be orthogonal to the axis, and penetrates the inner peripheral portion. The position where the second slit is disposed is a position that is closer to the proximal end than a portion of the cam follower to be in contact with the inner wall surface of the cam groove and a portion of the cam follower to be in contact with the inner wall surface of the straight groove and is closer to the distal end than the press-fitting portion. Since the cam follower comprises the second slit in addition to the first slit as described above, the influence of the deformation of the fitting portion to be fitted to one groove on the fitting portion to be fitted to the other groove can be reduced. Accordingly, only a necessary portion can be elastically deformed. Therefore, even in a case where there are variations in the machining accuracy of the respective grooves, the cam follower can be made to be in pressure contact with the respective grooves appropriately. As a result, the occurrence of backlash can be appropriately prevented. Further, since the cam follower comprises the second slit in addition to the first slit, the influence of the deformation of the fitting portion to be fitted to each groove on the shape of the press-fitting portion can be reduced. Accordingly, the cam follower can be mounted with high accuracy.

(2) In the lens barrel according to (1), end portions of the first slit and the second slit have a round shape.

According to this aspect, the end portions of the first slit and the second slit have a round shape. Accordingly, stress concentration can be prevented. Therefore, even in a case where repeated stress acts, a reduction in the strength of the cam follower can be prevented. Accordingly, the modulus of elasticity of the cam follower can also be uniformized.

(3) In the lens barrel according to (1) or (2), the cam follower includes the first slits provided at a plurality of positions at regular intervals in a circumferential direction.

According to this aspect, the cam follower includes the first slits provided at a plurality of positions at regular intervals in a circumferential direction. In this case, the cam follower is divided into equal pieces in the circumferential direction by the plurality of first slits.

(4) In the lens barrel according to (3), the cam follower includes the first slits arranged at two positions in the circumferential direction.

According to this aspect, the cam follower includes the first slits arranged at two positions in the circumferential direction. In this case, the respective first slits are arranged at position facing each other with the axis of the cam follower interposed therebetween. Further, the respective first slits are arranged on a straight line passing through the center of the cam follower. Accordingly, the cam follower is divided into two equal pieces in the circumferential direction by the two first slits.

(5) In the lens barrel according to (4), the first slit of the cam follower mounted on the movable barrel is positioned substantially in a middle portion of a width of the cam groove.

According to this aspect, the cam follower is mounted on the movable barrel so that each of the two first slits arranged on the straight line is positioned in the middle portion of the width of the cam groove. In other words, the cam follower is mounted on the movable barrel so that a straight line passing through the two first slits is substantially parallel to the cam groove. Accordingly, elasticity can be efficiently used. The "middle portion" mentioned here includes a portion that is substantially recognized as the middle.

(6) In the lens barrel according to any one of (3) to (5), the cam follower includes the second slit disposed between the first slits adjacent to each other.

According to this aspect, in a case where the cam follower includes a plurality of first slits, the cam follower includes the second slit disposed between the first slits adjacent to each other. Accordingly, the respective portions, which are equally divided in the circumferential direction by the first slits, can be appropriately elastically deformed.

(7) In the lens barrel according to (6), a length in the circumferential direction between an end portion of the second slit and the first slit is in a range of 10% to 20% of an entire circumference.

According to this aspect, a length in the circumferential direction between the end portion of the second slit and the first slit is set in the range of 10% to 20% of the entire circumference. Accordingly, the first slit and the second slit can be appropriately arranged while sufficient strength is ensured.

(8) In the lens barrel according to any one of (1) to (7), the cam follower includes a through-hole that is provided in a bottom of the inner peripheral portion and is parallel to the axis, a fastening member passes through the through-hole from the inner peripheral portion, and the cam follower is fixed to the movable barrel by the fastening member.

According to this aspect, the cam follower includes the through-hole that is provided in the bottom of the inner peripheral portion and is parallel to the axis. The fastening member passes through the through-hole from the inner peripheral portion and is fastened to the movable barrel, so that the cam follower is fixed to the movable barrel. Accordingly, since the cam follower can be more firmly fixed, the separation of the cam follower can be effectively prevented.

(9) In the lens barrel according to (8), at least a surface of the bottom of the inner peripheral portion of the cam follower, which is to be in contact with the fastening member, is positioned closer to the proximal end than a distal end-side inner wall surface of the second slit.

According to this aspect, at least a surface of the bottom of the inner peripheral portion, which is to be in contact with the fastening member, is positioned closer to the proximal end than the distal end-side inner wall surface of the second slit. Accordingly, since the transmission of a force, which is applied from the fastening member in a case where the cam follower is fixed by the fastening member, to the fitting portions to be fitted to the cam groove and the straight groove can be prevented, the deformation of the fitting portions can be prevented.

(10) In the lens barrel according to (9), the first slit of the cam follower is cut in up to the bottom of the inner peripheral portion.

According to this aspect, the first slit is cut in up to the bottom of the inner peripheral portion. Accordingly, the fitting portions to be fitted to the cam groove and the straight groove can be elastically deformed sufficiently while the deformation of the press-fitting portion is prevented.

(11) A cam follower is provided on a movable barrel and has a hollow shape and of which a distal end to be fitted to a straight groove provided in a first barrel and a cam groove provided in a second barrel is open, in a lens barrel that moves the movable barrel disposed in the first barrel and the second barrel along an optical axis by relative rotation of the first barrel and the second barrel. The cam follower comprises a press-fitting portion that is provided at a proximal end portion thereof and is to be press-fitted to a protruding portion or a recessed portion provided on the movable barrel, a surface to be in contact with an inner wall surface of the cam groove and a surface to be in contact with an inner wall surface of the straight groove that have an arc shape convex toward an outside, and a first slit that is cut in from the distal end toward a proximal end thereof in parallel to an axis and a second slit that is cut in from an outer peripheral portion of the cam follower toward an inner peripheral portion thereof so as to be orthogonal to the axis. The second slit is disposed at a position that is closer to the proximal end than a portion of the cam follower to be in contact with the inner wall surface of the cam groove and a portion of the cam follower to be in contact with the inner wall surface of the straight groove and is closer to the distal end than the press-fitting portion, and penetrates the inner peripheral portion.

According to this aspect, the cam follower includes an open distal end and has a hollow shape. The cam follower includes the press-fitting portion provided at the proximal end portion thereof, and is mounted on the movable barrel through the press-fitting portion. Specifically, the press-fitting portion is press-fitted to a protruding portion or a recessed portion provided on the movable barrel, so that the cam follower is mounted on the movable barrel.

Further, the surface of the cam follower to be in contact with the inner wall surface of the cam groove and the surface of the cam follower to be in contact with the inner wall surface of the straight groove have an arc shape convex toward an outside. Accordingly, the cam follower is in point contact with the inner wall surfaces of the cam groove and the straight groove, or is in contact with the inner wall surfaces of the cam groove and the straight groove in a state close to point contact. Therefore, the elasticity of the cam follower can be used efficiently. In addition, since the sliding resistance against the inner wall surface of each groove can be reduced, the cam follower can be smoothly operated. Moreover, the attitude of the movable barrel can also be stabilized.

Furthermore, the cam follower includes the first slit and the second slit. The first slit is cut in from the distal end of the cam follower toward the proximal end thereof in parallel to the axis. On the other hand, the second slit is cut in from the outer peripheral portion of the cam follower toward the inner peripheral portion thereof so as to be orthogonal to the axis, and penetrates the inner peripheral portion. The position where the second slit is disposed is a position that is closer to the proximal end than a portion of the cam follower to be in contact with the inner wall surface of the cam groove and a portion of the cam follower to be in contact with the inner wall surface of the straight groove and is closer to the distal end than the press-fitting portion. Since the cam follower comprises the second slit in addition to the first slit as described above, the influence of the deformation of the fitting portion to be fitted to one groove on the fitting portion to be fitted to the other groove can be reduced. Accordingly, only a necessary portion can be elastically deformed. Therefore, even in a case where there are variations in the machining accuracy of the respective grooves, the cam follower can be made to be in pressure contact with the respective grooves appropriately. As a result, the occurrence of backlash can be appropriately prevented. Further, since the cam follower comprises the second slit in addition to the first slit, the influence of the deformation of the fitting portion to be fitted to each groove on the shape of the press-fitting portion can be reduced. Accordingly, the cam follower can be mounted with high accuracy.

According to the invention, a lens barrel and a cam follower can appropriately prevent the occurrence of backlash and can be smoothly operated while relaxing the requirements for machining accuracy.

DESCRIPTION OF THE PREFERRED EMBODIMENTS

Preferred embodiments of the invention will be described below with reference to the accompanying drawings.

[Structure of Lens Device]

Figure 1:
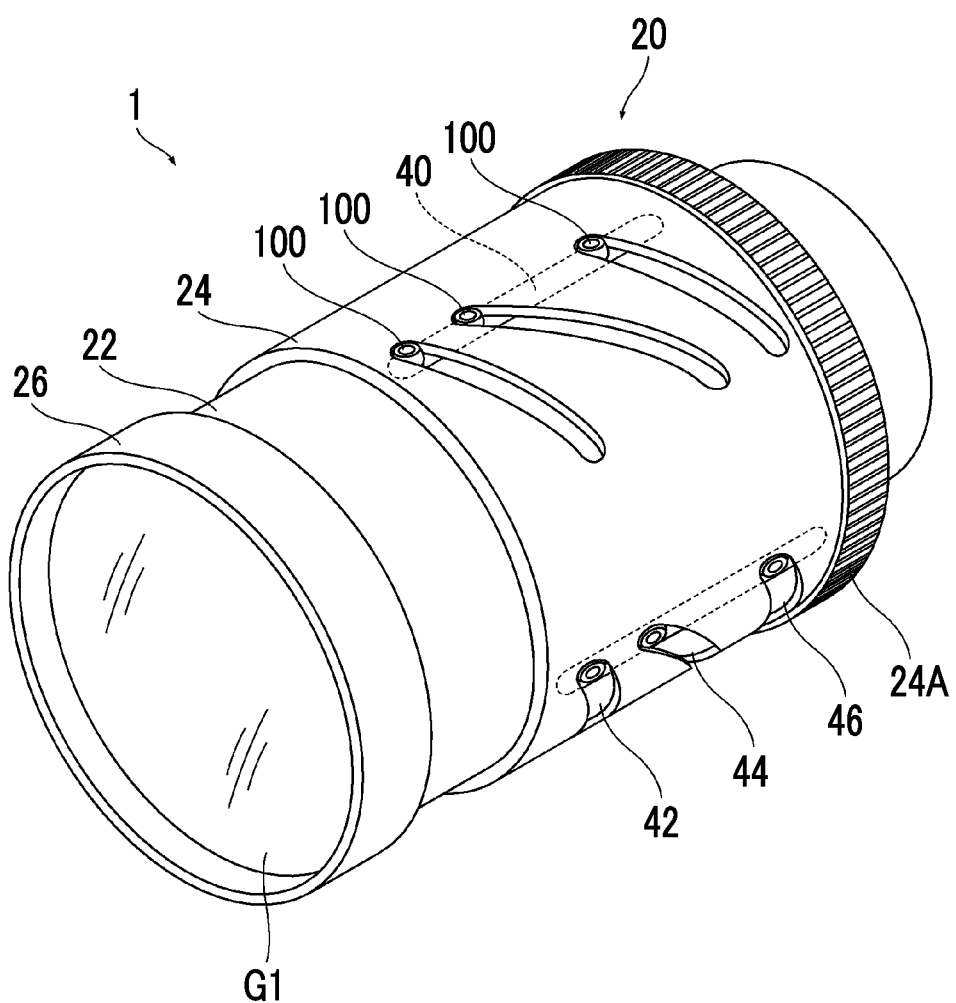
FIG. 1 is a perspective view showing an embodiment of a lens device to which the invention is applied.
Figure 2:
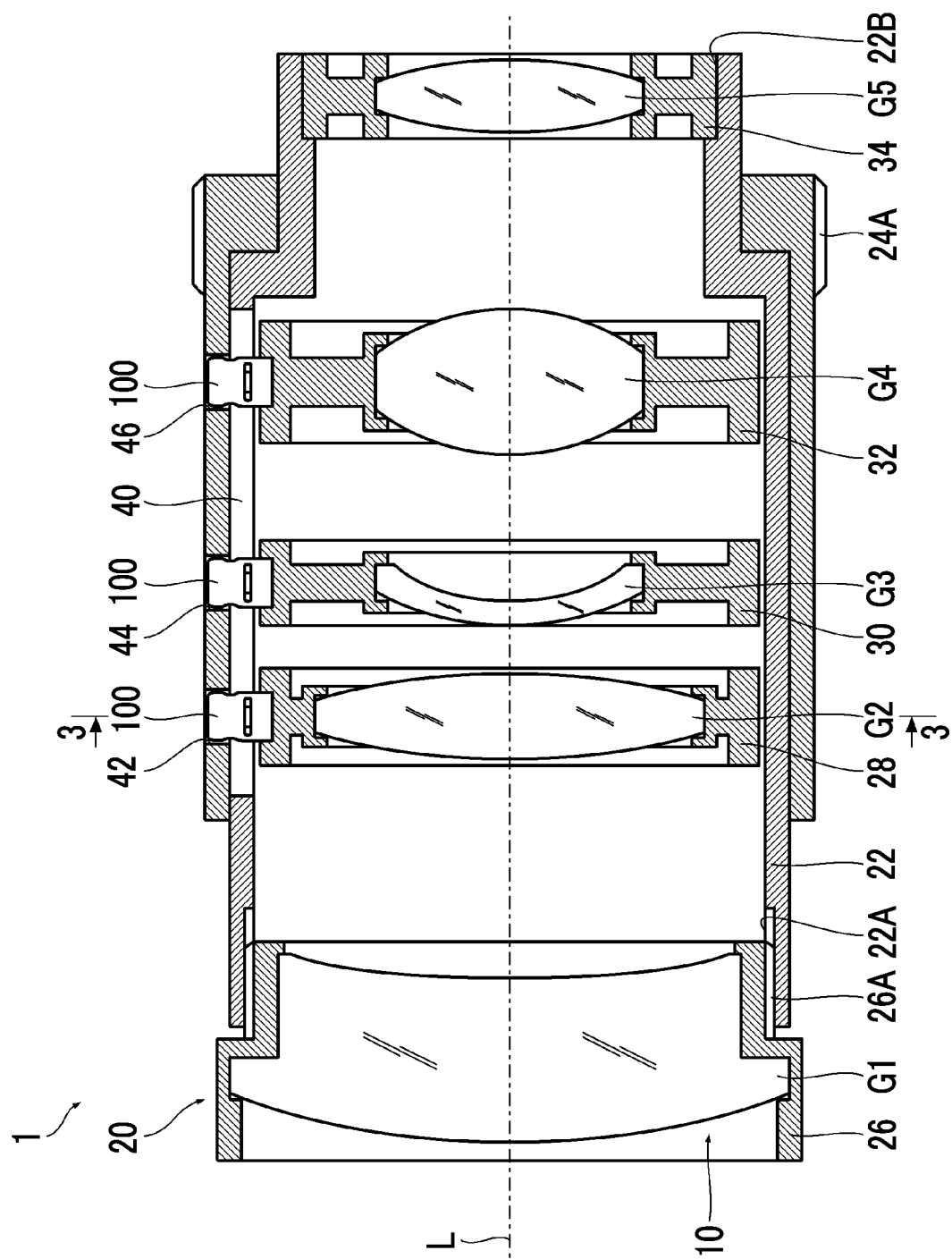
FIG. 2 is a cross-sectional view of the lens device shown in FIG. 1.
Figure 3:
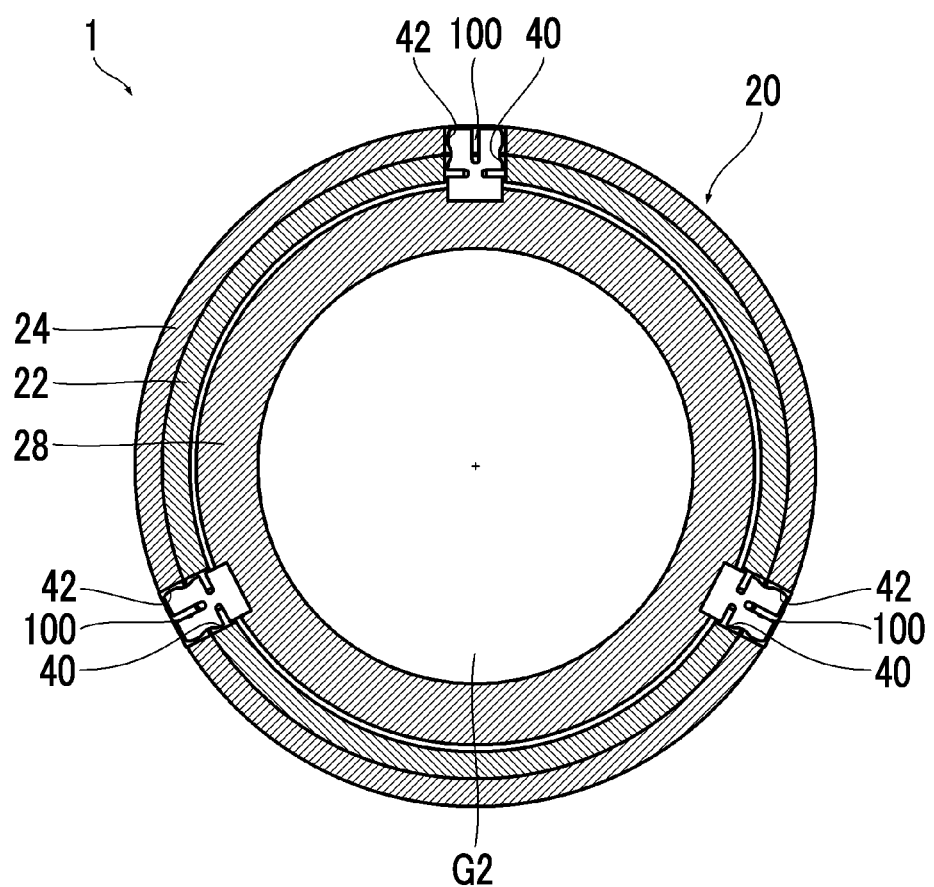
FIG. 3 is a cross-sectional view taken along line 3-3 of FIG. 2.

FIG. 1 is a perspective view showing an embodiment of a lens device to which the invention is applied. FIG. 2 is a cross-sectional view of the lens device shown in FIG. 1. FIG. 3 is a cross-sectional view taken along line 3-3 of FIG. 2.

The lens device 1 is a lens device for a projector, and is assembled with a projector body to compose a projection lens for a projector.

As shown in FIGS. 1 and 2, the lens device 1 comprises an optical system 10 and a lens barrel 20 that houses the optical system 10.

<<Optical System>>

The optical system 10 is composed of five lens groups, and a first lens group G1, a second lens group G2, a third lens group G3, a fourth lens group G4, and a fifth lens group G5 are arranged in this order from a screen side.

The first lens group G1 is a lens group for adjusting a focus. The first lens group G1 is moved back and forth along an optical axis L, so that the focus of the lens device 1 is adjusted.

The second lens group G2, the third lens group G3, and the fourth lens group G4 are lens groups for zoom. The second lens group G2, the third lens group G3, and the fourth lens group G4 are individually moved back and forth along the optical axis L, so that the focal length of the lens device 1 is changed.

The fifth lens group G5 is a stationary lens group, and is fixed at a certain position on the optical axis.

<<Lens Barrel>>

The lens barrel 20 comprises a stationary barrel 22, a rotary barrel 24, a first lens group-holding barrel 26, a second lens group-holding barrel 28, a third lens group-holding barrel 30, a fourth lens group-holding barrel 32, and a fifth lens group-holding barrel 34.

<Stationary Barrel>

The stationary barrel 22 is an example of a second barrel. The stationary barrel 22 includes straight grooves 40 provided on the peripheral surface thereof. The straight grooves 40 are grooves that guide the second lens group-holding barrel 28, the third lens group-holding barrel 30, and the fourth lens group-holding barrel 32 straight along the optical axis L, and are provided in parallel to the optical axis L. The straight grooves 40 are provided at three positions in the circumferential direction. The respective straight grooves 40 are arranged at regular intervals in the circumferential direction.

The stationary barrel 22 is fixed to the projector body by a fixing member (not shown). Accordingly, the lens device 1 is assembled with the projector body.

<Rotary Barrel>

The rotary barrel 24 is mounted on the outer peripheral portion of the stationary barrel 22, and is provided to be rotatable around the stationary barrel 22. The rotary barrel 24 is mounted on the outer peripheral portion of the stationary barrel 22, so that the rotary barrel 24 is disposed on the same axis as the stationary barrel 22. Accordingly, the rotary barrel 24 is rotated around the stationary barrel 22, so that the rotary barrel 24 is rotated about the optical axis L.

The rotary barrel 24 is an example of a first barrel. The rotary barrel 24 includes second lens group-moving cam grooves 42, third lens group-moving cam grooves 44, and fourth lens group-moving cam grooves 46 provided on the peripheral surface thereof.

The second lens group-moving cam grooves 42 are cam grooves that allow the second lens group-holding barrel 28 to be moved. The second lens group-moving cam grooves 42 are provided at three positions in the circumferential direction. The respective second lens group-moving cam grooves 42 are arranged on the same circumference and are arranged at regular intervals.

The third lens group-moving cam grooves 44 are cam grooves that allow the third lens group-holding barrel 30 to be moved. The third lens group-moving cam grooves 44 are provided at three positions in the circumferential direction. The respective third lens group-moving cam grooves 44 are arranged on the same circumference and are arranged at regular intervals.

The fourth lens group-moving cam grooves 46 are cam grooves that allow the fourth lens group-holding barrel 32 to be moved. The fourth lens group-moving cam grooves 46 are provided at three positions in the circumferential direction. The respective fourth lens group-moving cam grooves 46 are arranged on the same circumference and are arranged at regular intervals.

The rotary barrel 24 includes a gear portion 24A that is provided on the outer periphery of the proximal end portion thereof. The rotary barrel 24 of the lens device 1 is rotationally driven through the gear portion 24A.

<First Lens Group-Holding Barrel>

The first lens group-holding barrel 26 holds the first lens group G1. The first lens group-holding barrel 26 comprises a helicoid gear portion 26A provided on the outer periphery of the proximal end portion thereof. The stationary barrel 22 comprises a helicoid gear portion 22A that corresponds to the helicoid gear portion 26A of the first lens group-holding barrel 26 and is provided on the inner periphery of the distal end portion thereof. The helicoid gear portion 26A provided on the outer periphery of the proximal end portion of the first lens group-holding barrel 26 is engaged with the helicoid gear portion 22A provided on the inner periphery of the distal end portion of the stationary barrel 22, so that the first lens group-holding barrel 26 is mounted on the distal end portion of the stationary barrel 22. The first lens group-holding barrel 26 mounted on the stationary barrel 22 is rotated relative to the stationary barrel 22, so that the first lens group-holding barrel 26 is moved back and forth along the optical axis L. Accordingly, the focus of the lens device 1 is adjusted.

<Second Lens Group-Holding Barrel>

The second lens group-holding barrel 28 holds the second lens group G2. The second lens group-holding barrel 28 is an example of a movable barrel. The second lens group-holding barrel 28 is disposed in the stationary barrel 22 and is disposed on the same axis as the stationary barrel 22.

The second lens group-holding barrel 28 comprises cam followers 100 provided on the outer peripheral portion thereof. As shown in FIG. 3, the cam followers 100 are provided at three positions in the circumferential direction. The respective cam followers 100 are arranged on the same circumference and are arranged at regular intervals. The details of the cam follower 100 will be described later.

Cam follower-mounting portions, which are used to mount the cam followers 100, are provided on the outer peripheral portion of the second lens group-holding barrel 28. Each of the cam followers 100 is mounted on the cam follower-mounting portion. The structure of the cam follower-mounting portion will be described later.

The three cam followers 100 of the second lens group-holding barrel 28 are fitted to the three straight grooves 40 of the stationary barrel 22 and are fitted to the three second lens group-moving cam grooves 42 of the rotary barrel 24, respectively. Accordingly, the second lens group-holding barrel 28 is held in the stationary barrel 22.

In a case where the rotary barrel 24 is rotated relative to the stationary barrel 22, the cam followers 100 are moved along the straight grooves 40 by the action of the second lens group-moving cam grooves 42. As a result, the second lens group-holding barrel 28 is moved along the optical axis L and the second lens group G2 held by the second lens group-holding barrel 28 is moved along the optical axis L.

<Third Lens Group-Holding Barrel>

The third lens group-holding barrel 30 holds the third lens group G3. The third lens group-holding barrel 30 is an example of a movable barrel. The third lens group-holding barrel 30 is disposed in the stationary barrel 22 and is disposed on the same axis as the stationary barrel 22.

The third lens group-holding barrel 30 comprises cam followers 100 provided on the outer peripheral portion thereof. The structure of the cam follower 100 is the same as that of the cam follower 100 of the second lens group-holding barrel 28. The cam followers 100 are provided at three positions in the circumferential direction. The respective cam followers 100 are arranged on the same circumference and are arranged at regular intervals.

Cam follower-mounting portions, which are used to mount the cam followers 100, are provided on the outer peripheral portion of the third lens group-holding barrel 30. Each of the cam followers 100 is mounted on the cam follower-mounting portion. The structure of the cam follower-mounting portion is the same as that of the cam follower-mounting portion of the second lens group-holding barrel 28.

The three cam followers 100 of the third lens group-holding barrel 30 are fitted to the three straight grooves 40 of the stationary barrel 22 and are fitted to the three third lens group-moving cam grooves 44 of the rotary barrel 24, respectively. Accordingly, the third lens group-holding barrel 30 is held in the stationary barrel 22.

In a case where the rotary barrel 24 is rotated relative to the stationary barrel 22, the cam followers 100 are moved along the straight grooves 40 by the action of the third lens group-moving cam grooves 44. As a result, the third lens group-holding barrel 30 is moved along the optical axis L and the third lens group G3 held by the third lens group-holding barrel 30 is moved along the optical axis L.

<Fourth Lens Group-Holding Barrel>

The fourth lens group-holding barrel 32 holds the fourth lens group G4. The fourth lens group-holding barrel 32 is an example of a movable barrel. The fourth lens group-holding barrel 32 is disposed in the stationary barrel 22 and is disposed on the same axis as the stationary barrel 22.

The fourth lens group-holding barrel 32 comprises cam followers 100 provided on the outer peripheral portion thereof. The structure of the cam follower 100 is the same as that of the cam follower 100 of the second lens group-holding barrel 28. The cam followers 100 are provided at three positions in the circumferential direction. The respective cam followers 100 are arranged on the same circumference and are arranged at regular intervals.

Cam follower-mounting portions, which are used to mount the cam followers 100, are provided on the outer peripheral portion of the fourth lens group-holding barrel 32. Each of the cam followers 100 is mounted on the cam follower-mounting portion. The structure of the cam follower-mounting portion is the same as that of the cam follower-mounting portion of the second lens group-holding barrel 28.

The three cam followers 100 of the fourth lens group-holding barrel 32 are fitted to the three straight grooves 40 of the stationary barrel 22 and are fitted to the three fourth lens group-moving cam grooves 46 of the rotary barrel 24, respectively. Accordingly, the fourth lens group-holding barrel 32 is held in the stationary barrel 22.

In a case where the rotary barrel 24 is rotated relative to the stationary barrel 22, the cam followers 100 are moved along the straight grooves 40 by the action of the fourth lens group-moving cam grooves 46. As a result, the fourth lens group-holding barrel 32 is moved along the optical axis L and the fourth lens group G4 held by the fourth lens group-holding barrel 32 is moved along the optical axis L.

<Fifth Lens Group-Holding Barrel>

The fifth lens group-holding barrel 34 holds the fifth lens group G5. The fifth lens group-holding barrel 34 is fixedly mounted on the proximal end portion of the stationary barrel 22. A fifth lens group-holding barrel-mounting portion 22B, which is used to mount the fifth lens group-holding barrel 34, is provided at the proximal end portion of the stationary barrel 22. The fifth lens group-holding barrel 34 is mounted on the fifth lens group-holding barrel-mounting portion 22B of the stationary barrel 22, and is fixed by a fixing member (not shown). Accordingly, the fifth lens group G5 is fixed at a certain position.

<<Cam Follower>>

Figure 4:
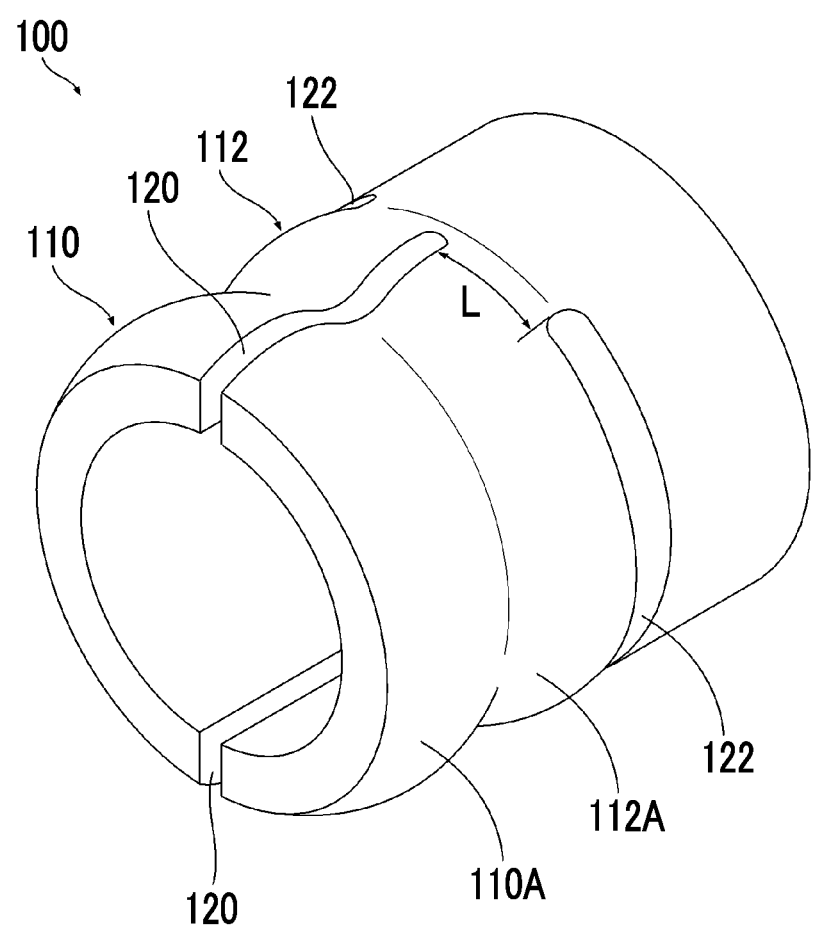
FIG. 4 is a perspective view of a cam follower.
Figure 5:
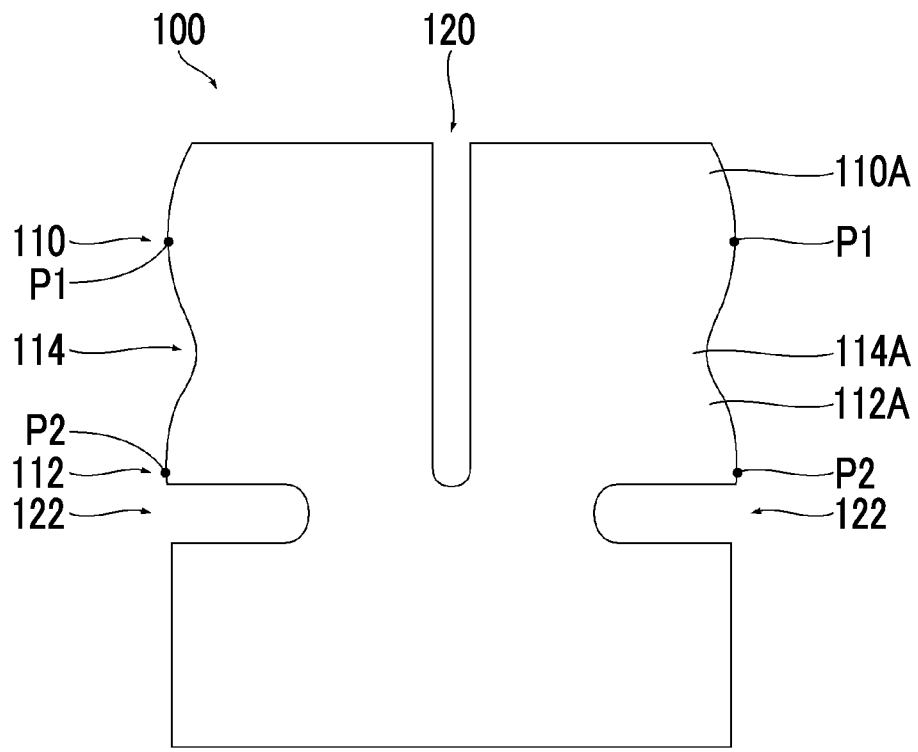
FIG. 5 is a front view of the cam follower.
Figure 6:
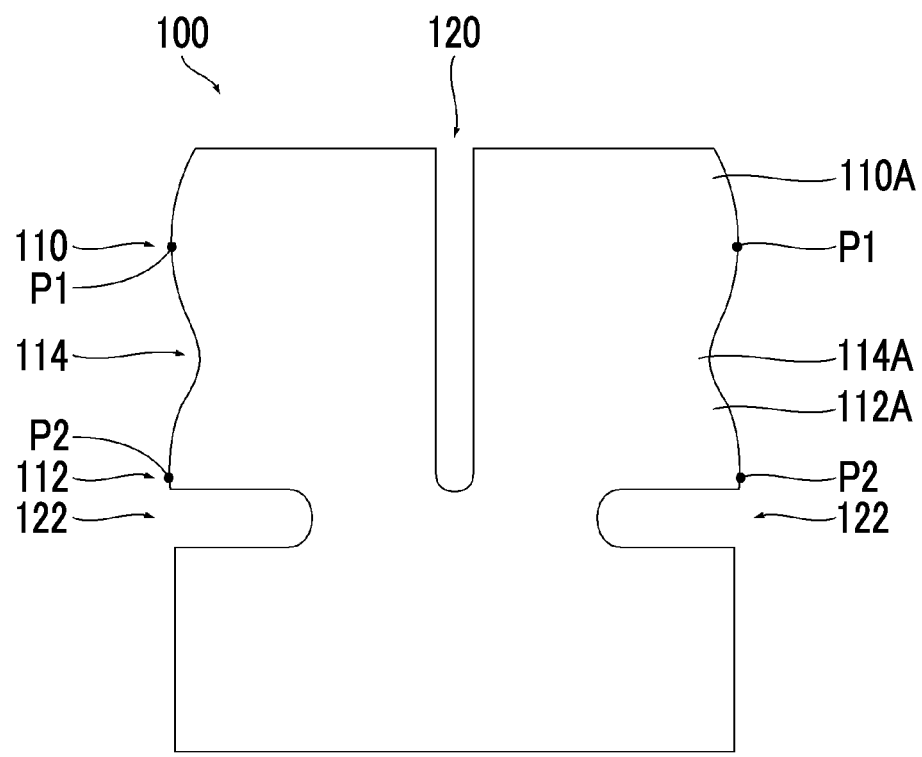
FIG. 6 is a rear view of the cam follower.
Figure 7:
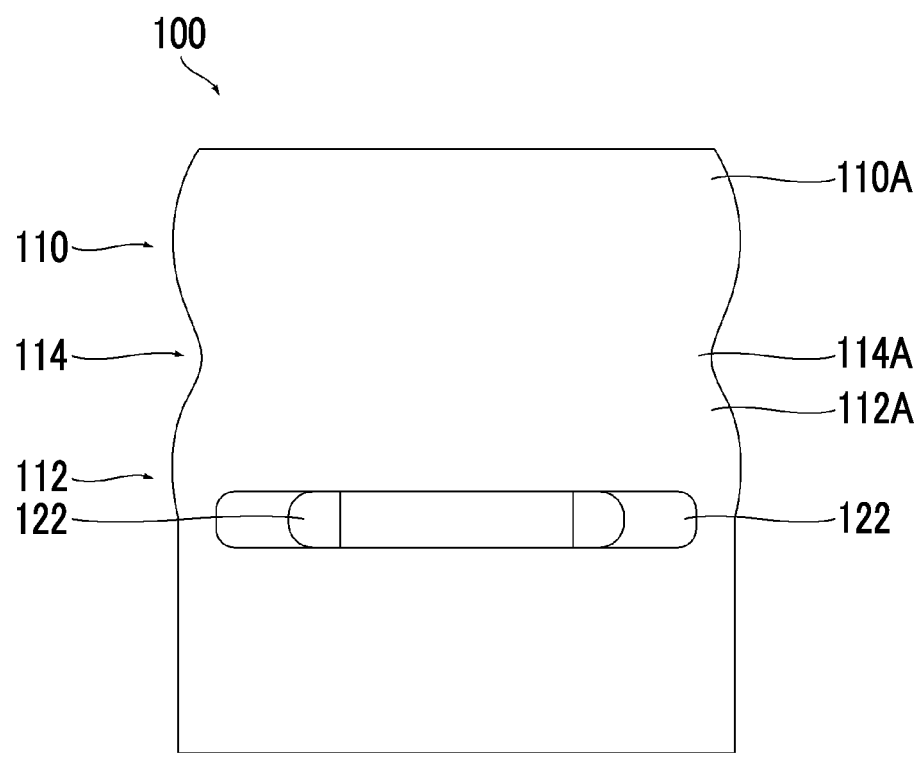
FIG. 7 is a left side view of the cam follower.
Figure 8:
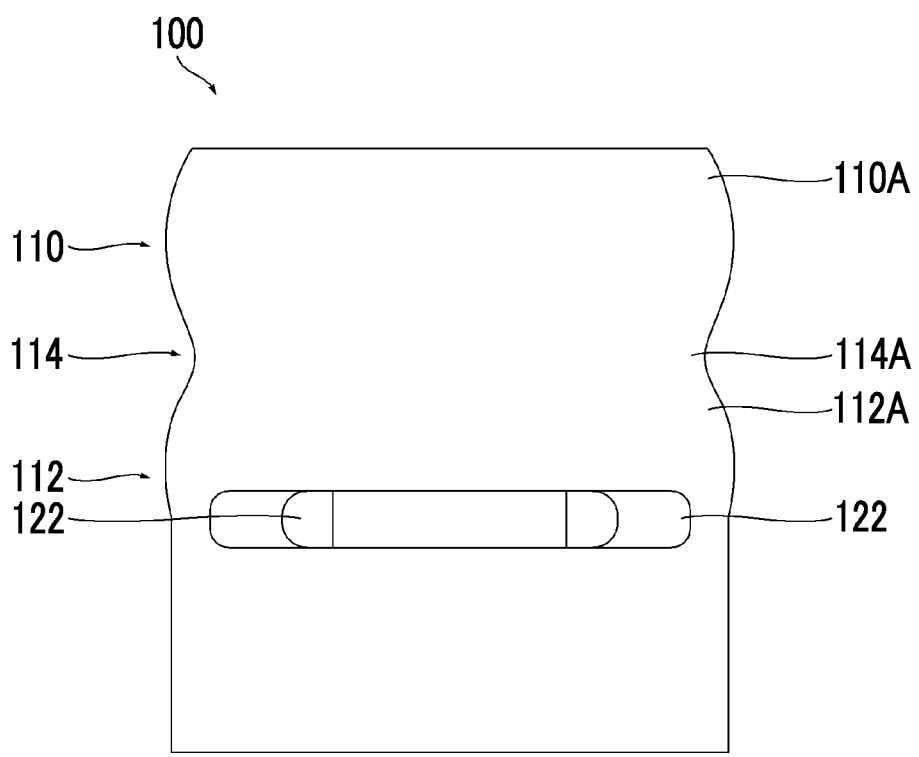
FIG. 8 is a right side view of the cam follower.
Figure 9:
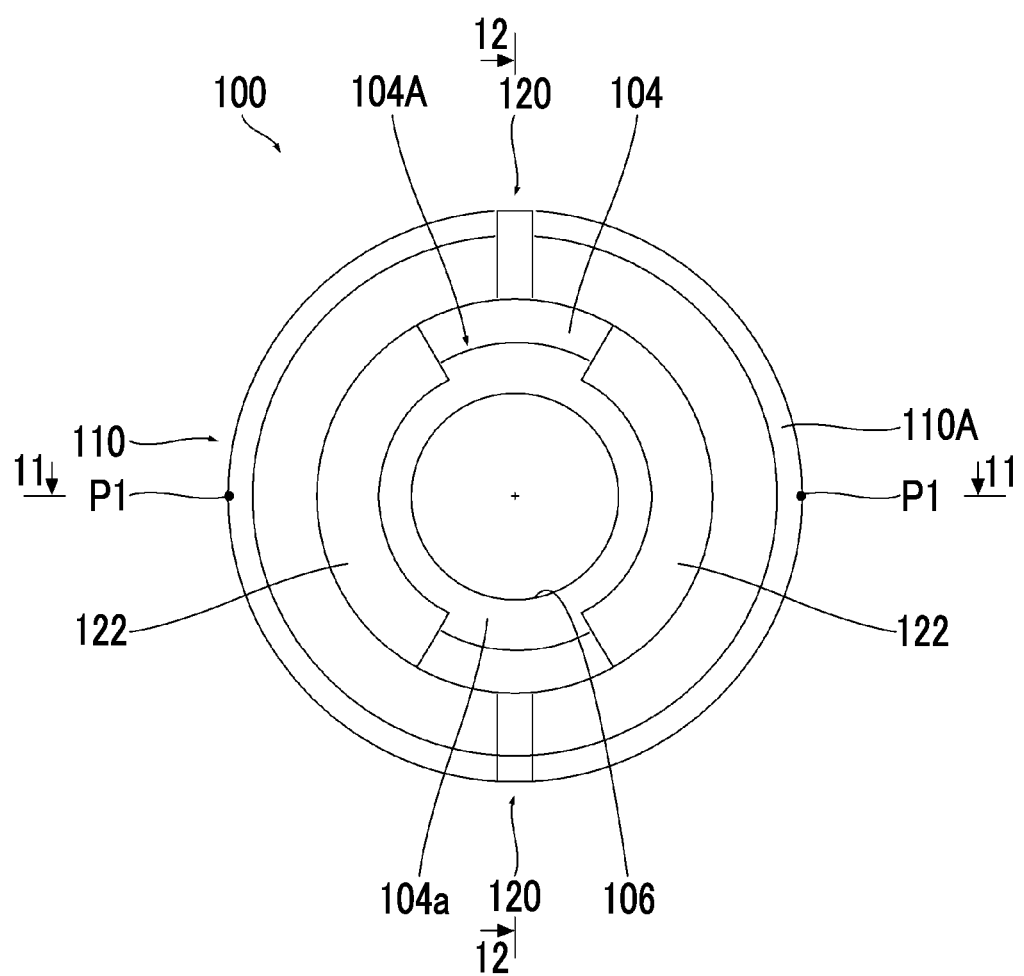
FIG. 9 is a plan view of the cam follower.
Figure 10:
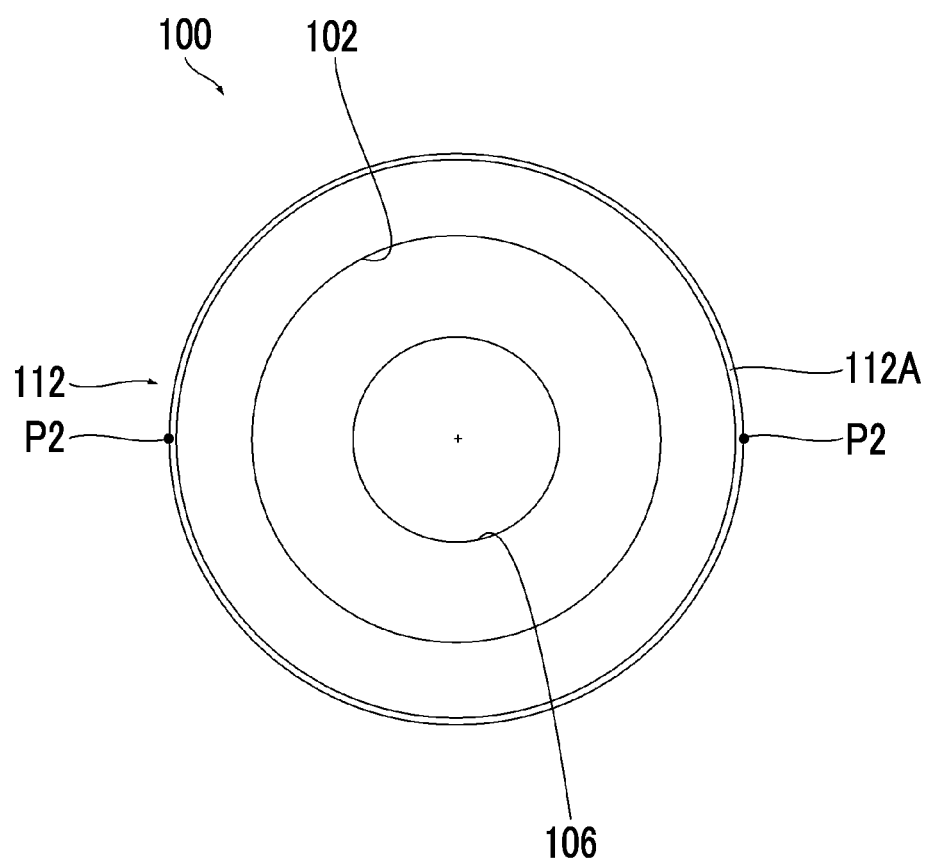
FIG. 10 is a bottom view of the cam follower.
Figure 11:
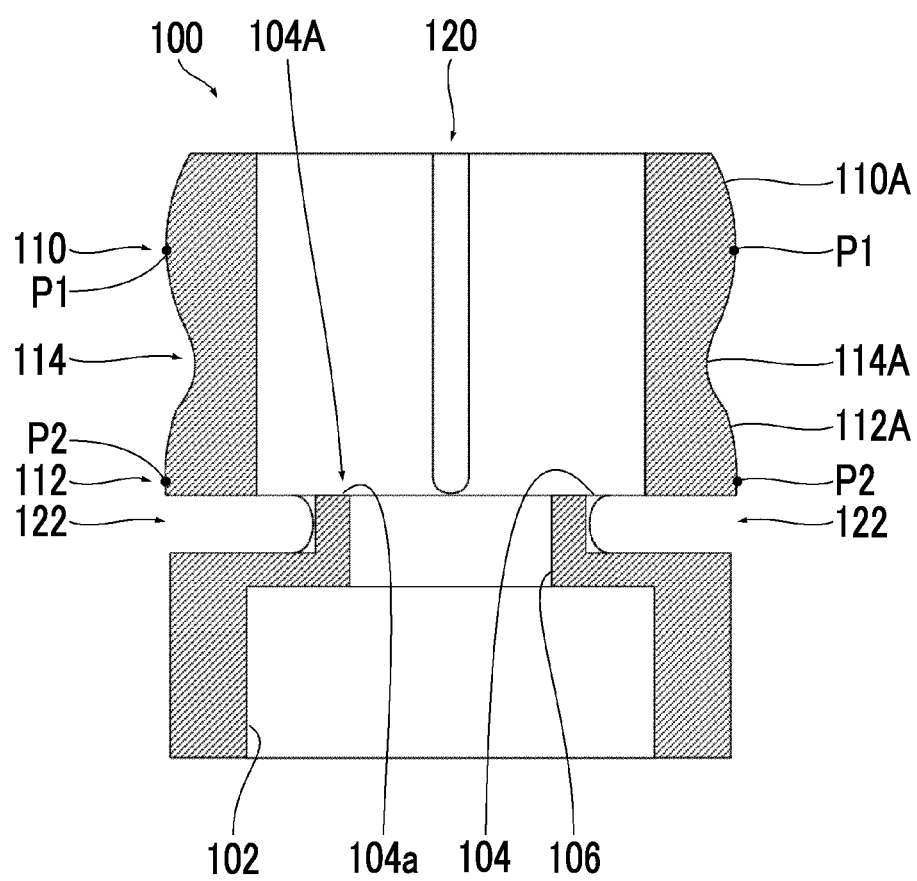
FIG. 11 is a cross-sectional view taken along line 11-11 of FIG. 9.
Figure 12:
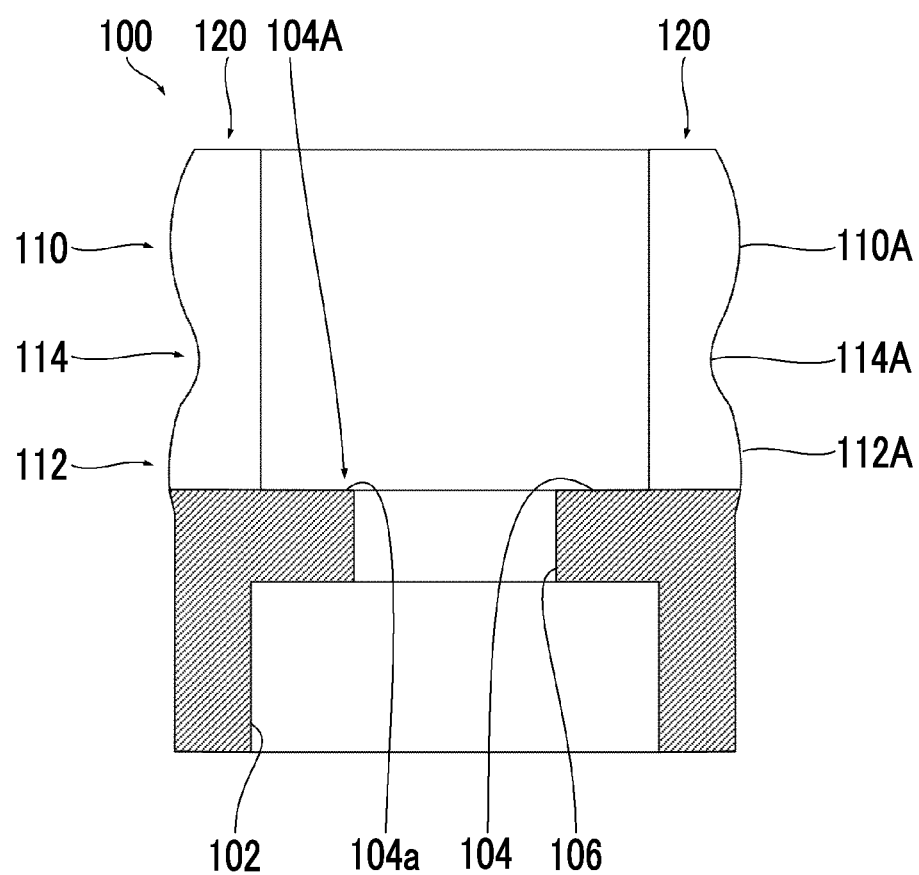
FIG. 12 is a cross-sectional view taken along line 12-12 of FIG. 9.
Figure 13:
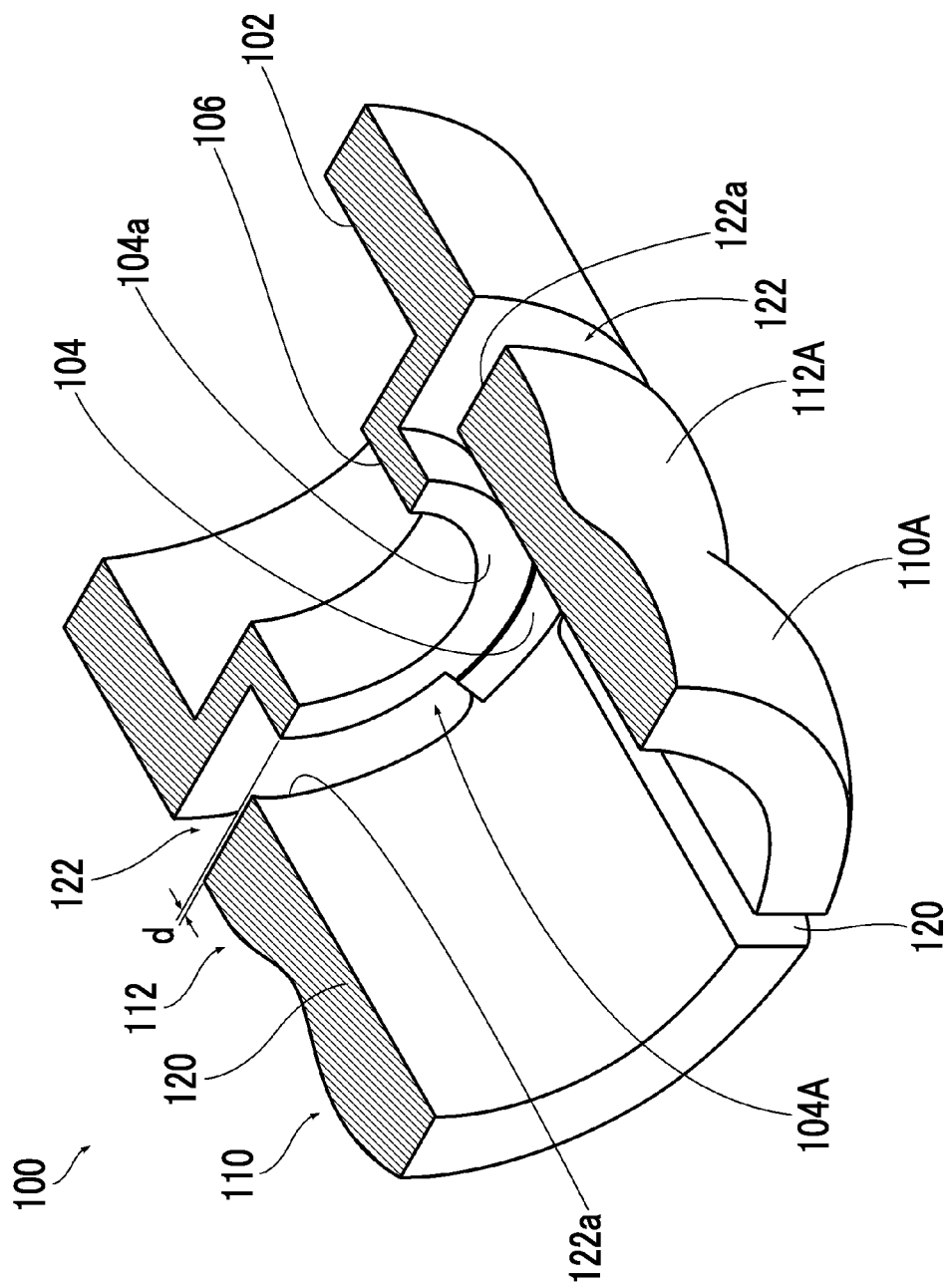
FIG. 13 is a cross-sectional perspective view of the cam follower.

FIG. 4 is a perspective view of the cam follower. FIG. 5 is a front view of the cam follower. FIG. 6 is a rear view of the cam follower. FIG. 7 is a left side view of the cam follower. FIG. 8 is a right side view of the cam follower. FIG. 9 is a plan view of the cam follower. FIG. 10 is a bottom view of the cam follower. FIG. 11 is a cross-sectional view taken along line 11-11 of FIG. 9. FIG. 12 is a cross-sectional view taken along line 12-12 of FIG. 9. FIG. 13 is a cross-sectional perspective view of the cam follower.

As shown in FIGS. 4 to 12, the cam follower 100 includes an open distal end and has a hollow shape. Accordingly, the cam follower 100 has a cylindrical shape as a whole. Further, as shown in FIGS. 5 and 6, the front and rear surfaces of the cam follower have the same shape. Likewise, as shown in FIGS. 7 and 8, the left and right side surfaces of the cam follower have the same shape.

<Press-Fitting Portion>

The cam follower 100 includes a press-fitting portion 102 provided at the proximal end portion thereof. The press-fitting portion 102 is formed of a recessed portion, and is provided on the bottom of the cam follower 100. Particularly, in this embodiment, the press-fitting portion 102 is formed of a circular recessed portion and is provided on the same axis as the axis of the cam follower 100. The cam follower 100 is mounted on the cam follower-mounting portion of each of the second lens group-holding barrel 28, the third lens group-holding barrel 30, and the fourth lens group-holding barrel 32 through the press-fitting portion 102.

Figure 14:
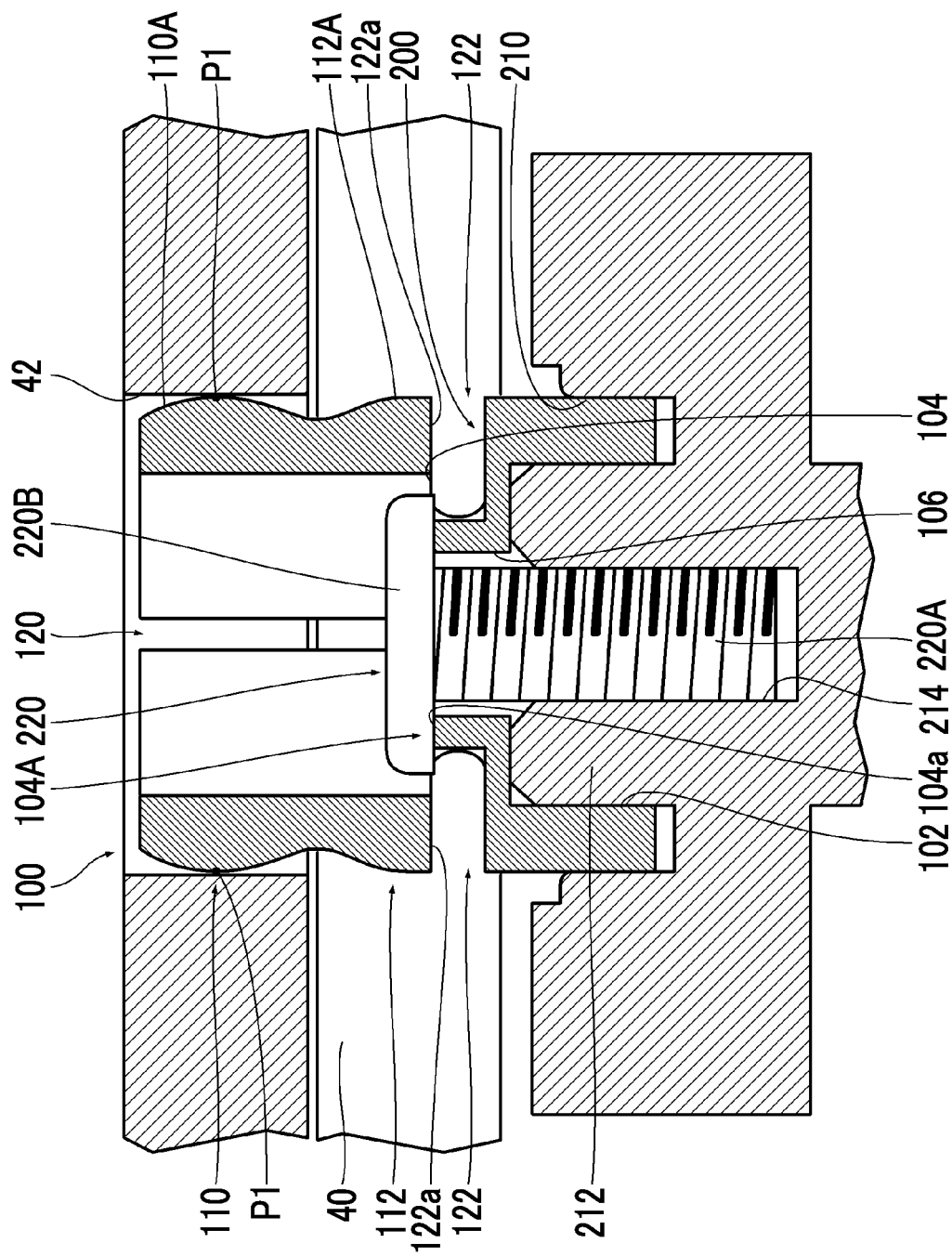
FIG. 14 is a cross-sectional view showing the structure of a cam follower-mounting portion.

FIG. 14 is a cross-sectional view showing the structure of the cam follower-mounting portion. FIG. 14 shows the structure of the cam follower-mounting portion of the second lens group-holding barrel 28. The cam follower-mounting portions of the third lens group-holding barrel 30 and the fourth lens group-holding barrel 32 also have the same structure as the structure shown in FIG. 14.

As shown in FIG. 14, the cam follower-mounting portion 200 includes a recessed portion 210 in which the proximal end portion of the cam follower 100 is to be housed, a boss 212 that is provided in the recessed portion 210, and a threaded hole 214 that is provided in the boss 212.

The recessed portion 210 has a shape corresponding to the shape of the proximal end portion of the cam follower 100, and has a circular shape. The recessed portion 210 has an inner diameter slightly larger than the outer diameter of the proximal end portion of the cam follower 100.

The boss 212 is an example of a protruding portion. The boss 212 has a shape corresponding to the shape of the press-fitting portion 102. In this embodiment, the boss 212 has a columnar shape so as to correspond to the shape of the press-fitting portion 102 having a circular shape. The boss 212 has an outer diameter slightly larger than the inner diameter of the press-fitting portion 102. The boss 212 is press-fitted to the press-fitting portion 102, so that the cam follower 100 is fixed to the boss 212 by so-called interference fit.

The threaded hole 214 is provided on the same axis as the axis of the boss 212. A cam follower-fixing screw 220 is mounted in the threaded hole 214. The cam follower-fixing screw 220 is an example of a fastening member, and is a screw that fixes the cam follower 100 to the boss 212.

The cam follower 100 includes a through-hole 106 that is provided in a bottom 104 of the inner peripheral portion thereof. The through-hole 106 is a hole through which the cam follower-fixing screw 220 is to pass, and is provided on the same axis as the axis of the cam follower 100. The through-hole 106 has a diameter corresponding to the diameter of a screw portion 220A of the cam follower-fixing screw 220, and penetrates the press-fitting portion 102.

The cam follower-fixing screw 220 passes through the through-hole 106 from the inner peripheral portion of the distal end side of the cam follower 100 of which the press-fitting portion 102 is press-fitted to the boss 212, and is screwed with the threaded hole 214. Accordingly, the cam follower 100 is fixed to the boss 212 by the cam follower-fixing screw 220. That is, the bottom portion of the inner peripheral portion of the cam follower is interposed between a head portion 220B of the cam follower-fixing screw 220 and the boss 212, and is fixed to the boss 212.

Further, the cam follower 100 includes a seat surface portion 104A provided in the middle portion of the bottom 104. The seat surface portion 104A is formed of a recessed portion, and the bottom of the recessed portion functions as a seat surface 104a for the cam follower-fixing screw 220. That is, the bottom of the recessed portion functions as a surface that receives the head portion 220B of the cam follower-fixing screw 220. The head portion 220B is in contact with the seat surface 104a, so that the cam follower-fixing screw 220 fixes the cam follower 100 to the boss 212.

As described later, the position of the seat surface 104a is set to be closer to a proximal end than the distal end-side inner wall surface of the second slits 122 (see FIG. 14).

<First Fitting Portion and Second Fitting Portion>

The cam follower 100 includes a first fitting portion 110 and a second fitting portion 112 that are provided at the distal end portion thereof. The first fitting portion 110 is a portion to be fitted to the cam grooves (the second lens group-moving cam groove 42, the third lens group-moving cam groove 44, and the fourth lens group-moving cam groove 46) of the rotary barrel 24. Further, the second fitting portion 112 is a portion to be fitted to the straight groove 40 of the stationary barrel 22. The first fitting portion 110 and the second fitting portion 112 are disposed in this order from a distal end side, and are successively arranged.

[First Fitting Portion]

An outer peripheral surface 110A of the first fitting portion 110 to be fitted to the cam grooves (the second lens group-moving cam groove 42, the third lens group-moving cam groove 44, and the fourth lens group-moving cam groove 46) is formed as a surface that is to be in contact with the inner wall surface of the cam groove.

The first fitting portion 110 has a shape swollen in a spherical shape, and has a shape where an outer diameter is gradually reduced toward both end portions from the middle portion in the axial direction. As a result, the outer peripheral surface 110A of the first fitting portion 110 has an arc shape convex toward the outside. That is, the shape of the cross section of the first fitting portion 110 is an arc shape convex toward the outside.

In a case where the first fitting portion 110 having this structure is fitted to the cam grooves (the second lens group-moving cam groove 42, the third lens group-moving cam groove 44, and the fourth lens group-moving cam groove 46), the first fitting portion 110 is in point contact with the inner wall surfaces of the cam grooves. A cam groove-contact portion P1, which is a portion to be in contact, is a portion where the outer diameter of the first fitting portion 110 is maximum. This portion is a substantially middle portion of the first fitting portion 110 in the axial direction.

[Second Fitting Portion]

An outer peripheral surface 112A of the second fitting portion 112 to be fitted to the straight groove 40 is formed as a surface that is to be in contact with the inner wall surface of the straight groove 40.

The second fitting portion 112 has a shape swollen in a spherical shape, and has a shape where an outer diameter is gradually reduced toward both end portions from the middle portion in the axial direction. As a result, the outer peripheral surface 112A of the second fitting portion 112 has an arc shape convex toward the outside. That is, the shape of the cross section of the second fitting portion 112 is an arc shape convex toward the outside.

In a case where the second fitting portion 112 having this structure is fitted to the straight groove 40, the second fitting portion 112 is in point contact with the inner wall surface of the straight groove 40. A straight groove-contact portion P2, which is a portion to be in contact, is a portion where the outer diameter of the second fitting portion 112 is maximum. This portion of the second fitting portion 112 is a substantially middle portion in the axial direction.

A region between the first fitting portion 110 and the second fitting portion 112 is formed as a constricted portion 114, and an outer peripheral surface 114A of the constricted portion 114 has an arc shape concave toward the inside. That is, the shape of the cross section of the constricted portion 114 is an arc shape concave toward the inside.

<First Slit>

The cam follower 100 includes first slits 120. Each of the first slits 120 is cut in from the distal end of the cam follower 100 toward the proximal end thereof in parallel to an axis, and is formed as a gap that penetrates the outer peripheral portion and the inner peripheral portion and has a constant width.

The first slits 120 are provided at two positions in the circumferential direction. The respective first slits 120 are arranged at regular intervals. Accordingly, the respective first slits 120 are arranged at position facing each other with the axis of the cam follower 100 interposed therebetween. Further, the respective first slits 120 are arranged on a straight line passing through the center of the cam follower 100, and have a shape cut along the straight line. As a result, the distal end portion of the cam follower 100 is divided into two equal pieces in the circumferential direction by the two first slits 120.

Each of the first slits 120 is cut in up to the position of the bottom 104 of the inner peripheral portion of the cam follower 100. Accordingly, the first fitting portion 110 and the second fitting portion 112 can be adapted to be elastically deformable in a radial direction while the deformation of the press-fitting portion 102 is prevented.

Further, the end portion of each first slit 120 has a round shape. Since the end portion of each first slit 120 has a round shape, stress concentration can be prevented. Accordingly, even in a case where repeated stress acts, a reduction in the strength of the cam follower 100 can be prevented. Furthermore, since the end portion of each first slit 120 has a round shape, the modulus of elasticity of the cam follower 100 can also be uniformized.

<Second Slit>

The cam follower 100 includes second slits 122. Each of the second slits 122 is cut in from the outer peripheral portion of the cam follower 100 toward the inner peripheral portion thereof so as to be orthogonal to the axis, and is formed as a gap that penetrates the inner peripheral portion and has a constant width.

Each second slit 122 is provided at a position that is closer to the proximal end than a portion of the second fitting portion 112 to be in contact with the inner wall surface of the straight groove 40 and is closer to the distal end than the press-fitting portion 102.

Further, each second slit 122 is provided between the respective first slits 120. In the cam follower 100 according to this embodiment, the first slits 120 are provided at two positions in the circumferential direction. Accordingly, the second slits 122 are also provided at two positions in the circumferential direction. The two second slits 122 are arranged on the same circumference. Furthermore, the two second slits 122 are arranged so as to be symmetric with respect to a straight line passing through the two first slits 120.

In a case where the length of each second slit 122 is too short, the effects of the second slit 122 are not sufficiently obtained. On the other hand, in a case where the length of each second slit 122 is too long, the strength of the cam follower 100 is reduced. Accordingly, the length of each second slit is set to a length where sufficient effects are to be obtained while necessary strength is ensured.

Since the cam follower 100 comprises the second slits 122 in addition to the first slits 120 as described above, the influence of the deformation of one fitting portion on the other fitting portion can be reduced. For example, even in a case where the first fitting portion 110 provided close to the distal end is elastically deformed inward, it is possible to prevent the second fitting portion 112 from expanding outward due to the influence of the deformation of the first fitting portion 110. That is, only a necessary portion can be elastically deformed. Accordingly, even in a case where there are variations in the machining accuracy of the respective grooves, such as the cam grooves (the second lens group-moving cam groove 42, the third lens group-moving cam groove 44, and the fourth lens group-moving cam groove 46) and the straight groove 40, the cam follower 100 can be made to be in pressure contact with the respective grooves appropriately. As a result, the occurrence of backlash can be appropriately prevented. Moreover, since the influence of the deformation of each fitting portion on the shape of the press-fitting portion 102 can be reduced, the cam follower 100 can be mounted with high accuracy.

The end portion of each second slit 122 has a round shape like the first slit 120. Since the end portion of each second slit 122 has a round shape, stress concentration can be prevented. Accordingly, even in a case where repeated stress acts, a reduction in the strength of the cam follower 100 can be prevented. Further, since the end portion of each second slit 122 has a round shape, the modulus of elasticity of the cam follower 100 can also be uniformized.

The seat surface 104a provided on the bottom 104 of the inner peripheral portion is positioned closer to the proximal end than a distal end-side inner wall surface 122a of each second slit 122 as described above. Specifically, as shown in FIGS. 13 and 14, the position of the seat surface 104a is set to a position that is away from the position of the distal end-side inner wall surface 122a of each second slit 122 toward the proximal end by a distance d. Accordingly, since the transmission of a force received from the cam follower-fixing screw 220 to the first fitting portion 110 and the second fitting portion 112 can be prevented in a case where the cam follower 100 is fixed by the cam follower-fixing screw 220, the deformation of the first fitting portion 110 and the second fitting portion 112 can be prevented. That is, in a case where the cam follower 100 is fixed by the cam follower-fixing screw 220, the seat surface 104a receives a torsional force from the cam follower-fixing screw 220. Since the position of the seat surface 104a is set to a position that is closer to the proximal end than the distal end-side inner wall surface 122a of each second slit 122, the transmission of this force to the first fitting portion 110 and the second fitting portion 112 can be prevented. Accordingly, the torsional deformation of the first fitting portion 110 and the second fitting portion 112 can be prevented.

[Action of Lens Device]

<<Entire Action>>

In a case where the rotary barrel 24 is rotated relative to the stationary barrel 22, the second lens group-moving cam grooves 42, the third lens group-moving cam grooves 44, and the fourth lens group-moving cam grooves 46 of the rotary barrel 24 are rotated in the circumferential direction. As a result, the cam followers 100 provided on the second lens group-holding barrel 28, the third lens group-holding barrel 30, and the fourth lens group-holding barrel 32 are moved along the straight grooves 40. Accordingly, the second lens group G2, the third lens group G3, and the fourth lens group G4 are moved along the optical axis L, so that a focal length is changed.

Further, in a case where the first lens group-holding barrel 26 is rotated relative to the stationary barrel 22, the first lens group-holding barrel 26 is moved along the optical axis L while being rotated. Accordingly, the first lens group G1 is moved along the optical axis L while being rotated, so that a focus is adjusted.

<<Action of Cam Follower>>

The cam followers 100 are provided on the second lens group-holding barrel 28, the third lens group-holding barrel 30, and the fourth lens group-holding barrel 32 that are movable barrels. All the cam followers 100 provided on the respective holding barrels have the same action. The action of the cam followers 100 provided on the second lens group-holding barrel 28 will be representatively described here.

The cam followers 100 are mounted on the cam follower-mounting portions 200 of the second lens group-holding barrel 28. Each of the cam follower-mounting portions 200 includes the boss 212 and the boss 212 is press-fitted to the press-fitting portion 102, so that the cam follower 100 is mounted on the cam follower-mounting portion 200. Here, the first fitting portion 110 and the second fitting portion 112 of the cam follower 100 are adapted to be elastically deformable by the first slit 120 and the second slits 122. However, since the cam follower 100 comprises the second slits 122 in addition to the first slits 120, the deformation of the press-fitting portion 102 can be suppressed. That is, even in a case where the first fitting portion 110 and the second fitting portion 112 are elastically deformed, the influence of the elastic deformation on the press-fitting portion 102 can be suppressed. Accordingly, since the out of roundness of the press-fitting portion 102 can be ensured, the cam follower 100 can be accurately mounted at a predetermined position.

The cam follower 100 of which the press-fitting portion 102 is press-fitted to the boss 212 is further fixed to the boss 212 by the cam follower-fixing screw 220. The cam follower-fixing screw 220 passes through the through-hole 106 provided in the bottom 104 of the inner peripheral portion and is screwed with the threaded hole 214 provided in the boss 212, so that the cam follower 100 is fixed to the boss 212. Here, the bottom 104 receives a torsional force from the cam follower-fixing screw 220 in a case where the cam follower 100 is fixed by the cam follower-fixing screw 220. However, since the seat surface 104a is disposed closer to the proximal end than the distal end-side inner wall surface 122a of the second slit 122, the cam follower 100 can effectively prevent the transmission of the torsional force to the first fitting portion 110 and the second fitting portion 112. Accordingly, the torsional deformation of the first fitting portion 110 and the second fitting portion 112 can be prevented.

The first fitting portion 110 and the second fitting portion 112 provided close to the distal end of each of the cam followers 100 mounted on the second lens group-holding barrel 28 are fitted to the cam groove and the straight groove, respectively. Specifically, the first fitting portion 110 positioned close to the distal end is fitted to the second lens group-moving cam groove 42 of the rotary barrel 24, and the second fitting portion 112 positioned close to the proximal end is fitted to the straight groove 40 of the stationary barrel 22.

The first fitting portion 110 and the second fitting portion 112 have a shape swollen in a spherical shape, and the outer peripheral surfaces 110A and 112A thereof have an arc shape convex toward the outside. Accordingly, the outer peripheral surface 110A of the first fitting portion 110 is in point contact with the inner wall surface of the second lens group-moving cam groove 42, and the outer peripheral surface 112A of the second fitting portion 112 is in point contact with the inner wall surface of the straight groove 40. Therefore, the elasticity of the cam follower 100 can be used efficiently. In addition, since the sliding resistance against the inner wall surface of each groove can be reduced, the cam follower can be smoothly operated. Moreover, the attitude of the second lens group-holding barrel 28 can also be stabilized. Further, since the cam follower 100 has a shape that allows the cam follower 100 to easily slide on the inner wall surface of the groove even if the movable barrel has an attitude that seems to be excessively restrained due to a variation in the position of the straight groove, the stable attitude of the movable barrel can be held.

Furthermore, the first fitting portion 110 and the second fitting portion 112 of the cam follower 100 are adapted to be elastically deformable by the first slit 120 and the second slits 122. Since the cam follower 100 includes not only the first slits 120 parallel to the axis but also the second slits 122 orthogonal to the axis, the influence of the deformation of one fitting portion on the other fitting portion can be reduced. For example, even in a case where the first fitting portion 110 provided close to the distal end is elastically deformed inward, it is possible to prevent the second fitting portion 112 from expanding outward due to the influence of the deformation of the first fitting portion 110. That is, only a necessary portion can be elastically deformed. Accordingly, even in a case where there are variations in the machining accuracy of the respective grooves, such as the second lens group-moving cam groove 42 and the straight groove 40, the cam follower 100 can be made to be in pressure contact with the respective grooves appropriately. Therefore, the occurrence of backlash can be appropriately prevented.

Further, since the end portions of the first and second slits 120 and 122 have a round shape, a reduction in the strength of the cam follower 100 can be prevented even in a case where repeated stress acts. Accordingly, the modulus of elasticity of the cam follower 100 can also be uniformized.

Figure 15:
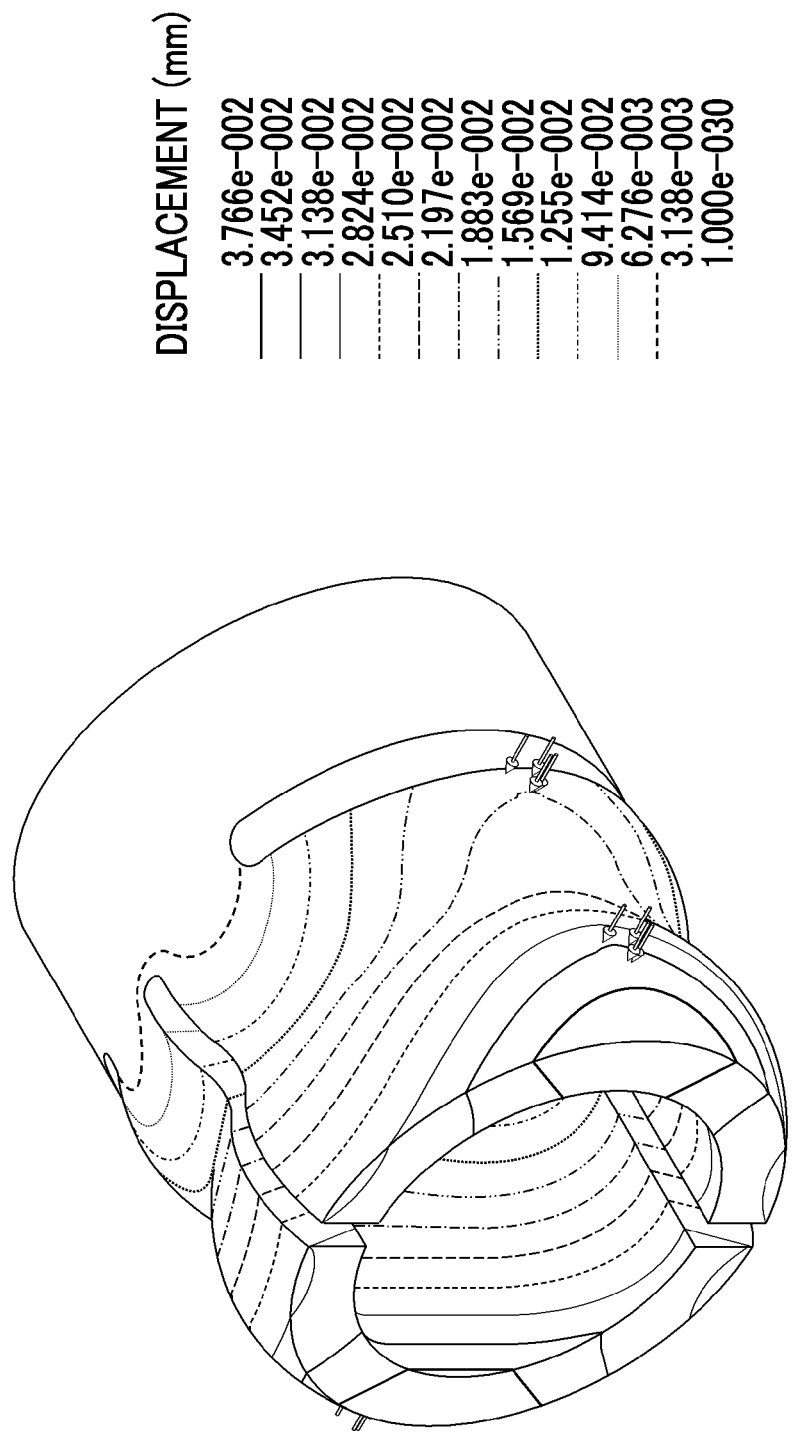
FIG. 15 is a diagram showing the analysis results of deformation of the cam follower according to this embodiment.

FIG. 15 is a diagram showing the analysis results of deformation of the cam follower according to this embodiment.

FIG. 15 shows the displacement of the respective portions, which is obtained in a case where a predetermined load (1N) acts on the cam groove-contact portion and the straight groove-contact portion of the cam follower 100, by contour lines. In FIG. 15, positions indicated by arrows are positions where the load acts (the cam groove-contact portion and the straight groove-contact portion).

Since the amount of displacement of the distal end is about 37.7 μm with respect to a load of 1 N as shown in FIG. 15, it can be confirmed that a sufficient spring constant is obtained. Accordingly, for example, even though the cam groove and the straight groove have a machining error of about 20 μm, backlash can be removed without a change in sliding resistance. Further, it can be confirmed that the proximal end side where the press-fitting portion is provided is not displaced as shown in FIG. 15. Accordingly, the cam follower can be accurately mounted on the movable barrel.

Figure 16:
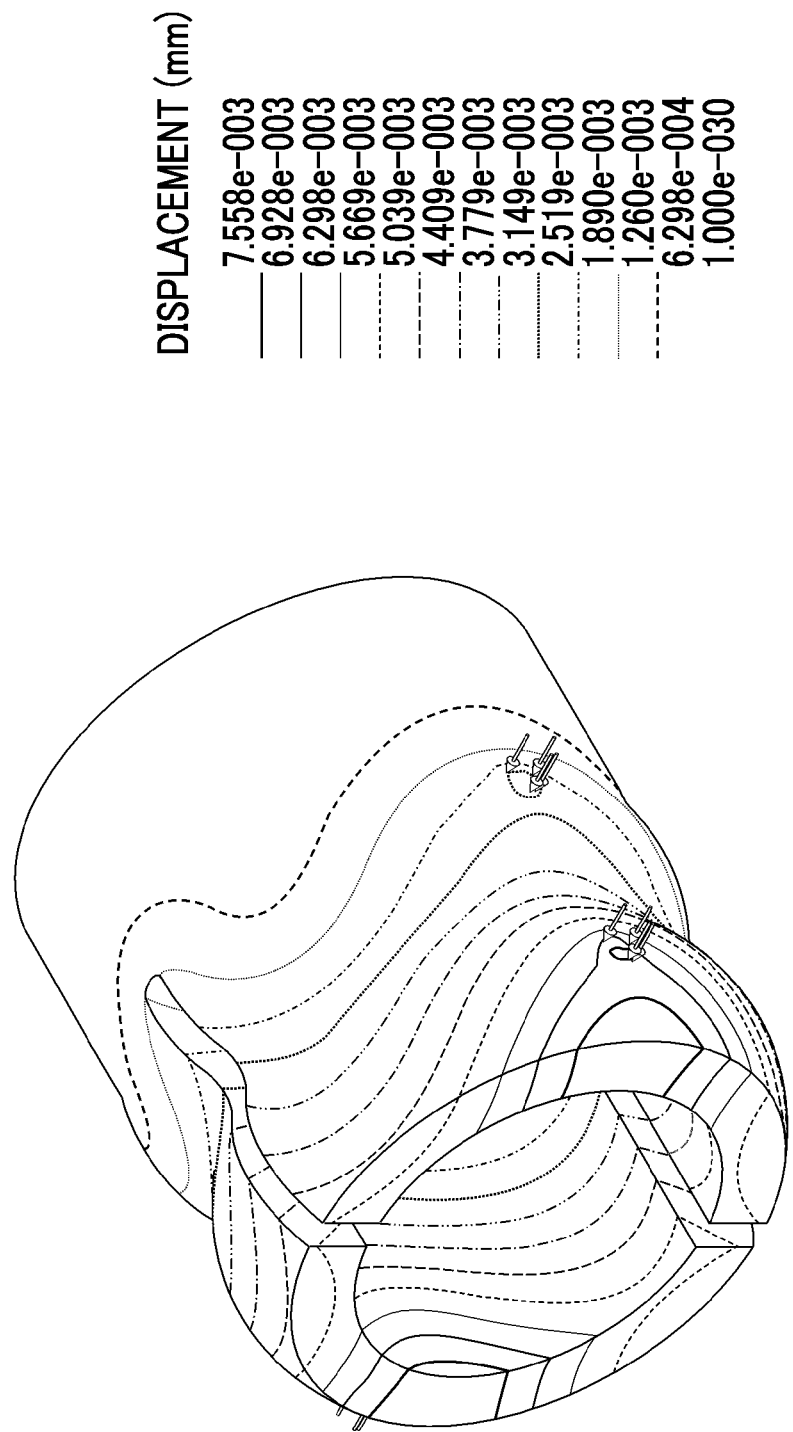
FIG. 16 is a diagram showing the analysis results of deformation in a case where the cam follower according to this embodiment does not include second slits.

FIG. 16 is a diagram showing the analysis results of deformation in a case where the cam follower according to this embodiment does not include second slits.

Since the amount of displacement of the distal end is about 7.6 μm even though the same load is applied to the same positions as described above as shown in FIG. 16, it can be confirmed that the cam follower according to this embodiment not including second slits is inferior in terms of a spring constant. Further, it can be confirmed that the press-fitting portion provided on the proximal end side is also deformed.

Figure 17:
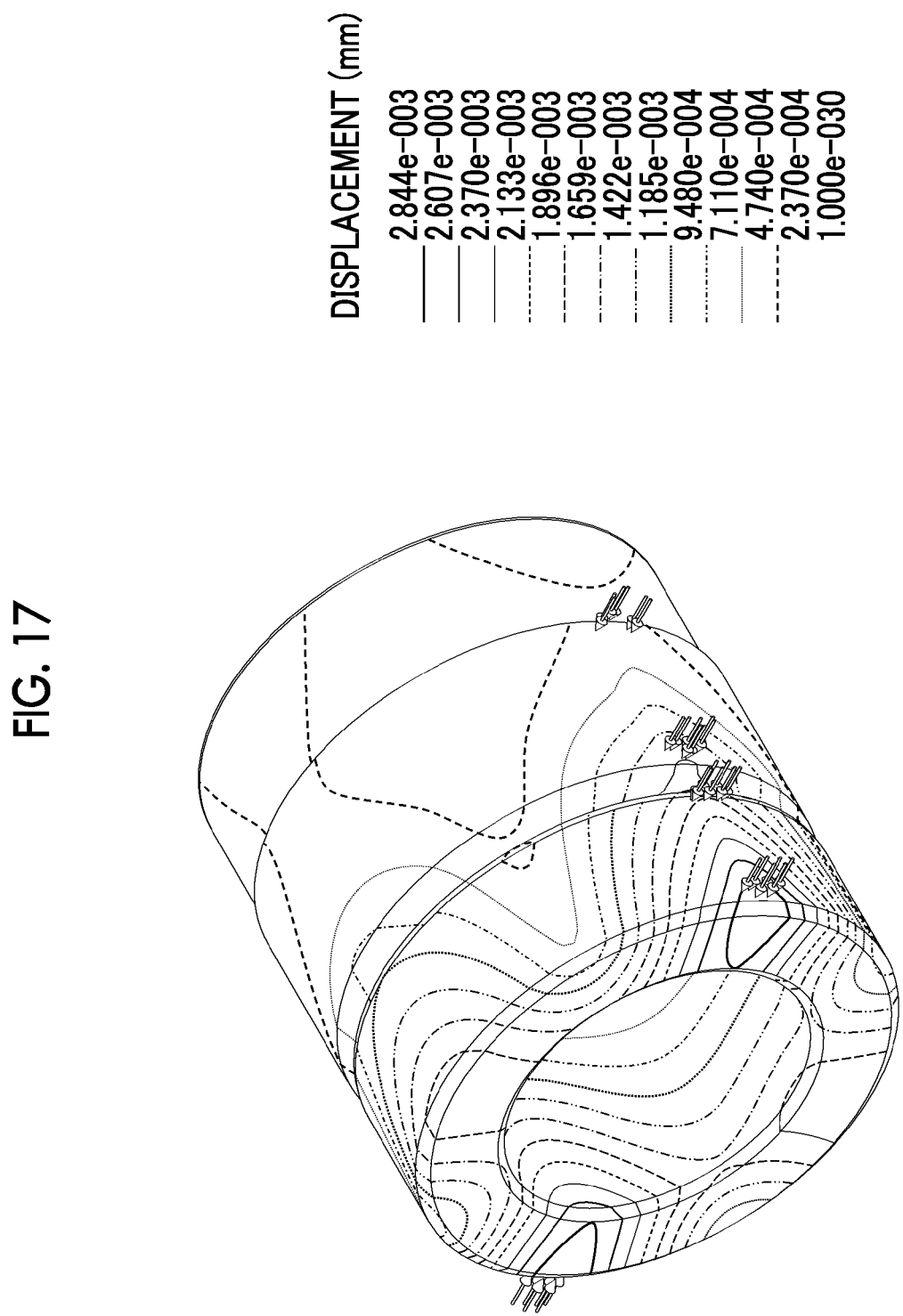
FIG. 17 is a diagram showing the analysis results of deformation of a cylindrical cam follower in the related art that does not include first slits and second slits.

FIG. 17 is a diagram showing the analysis results of deformation of a cylindrical cam follower in the related art that does not include first slits and second slits.

Since the amount of displacement of the distal end is about 2.8 μm as shown in FIG. 17, it can be confirmed that the cam follower in the related art is more inferior in terms of a spring constant. Further, it can be confirmed that the press-fitting portion provided on the proximal end side is also more significantly deformed.

[Modification Example of Cam Follower]

<<Modification Examples of First and Second Slits>>

<Modification Example of First Slit>

The first slits 120 have been provided at two positions on the peripheral surface at regular intervals in the embodiment, but an aspect where the first slits 120 are installed is not limited thereto. The first slit 120 has only to be provided at least one position on the peripheral surface of the cam follower 100.

Figure 18:
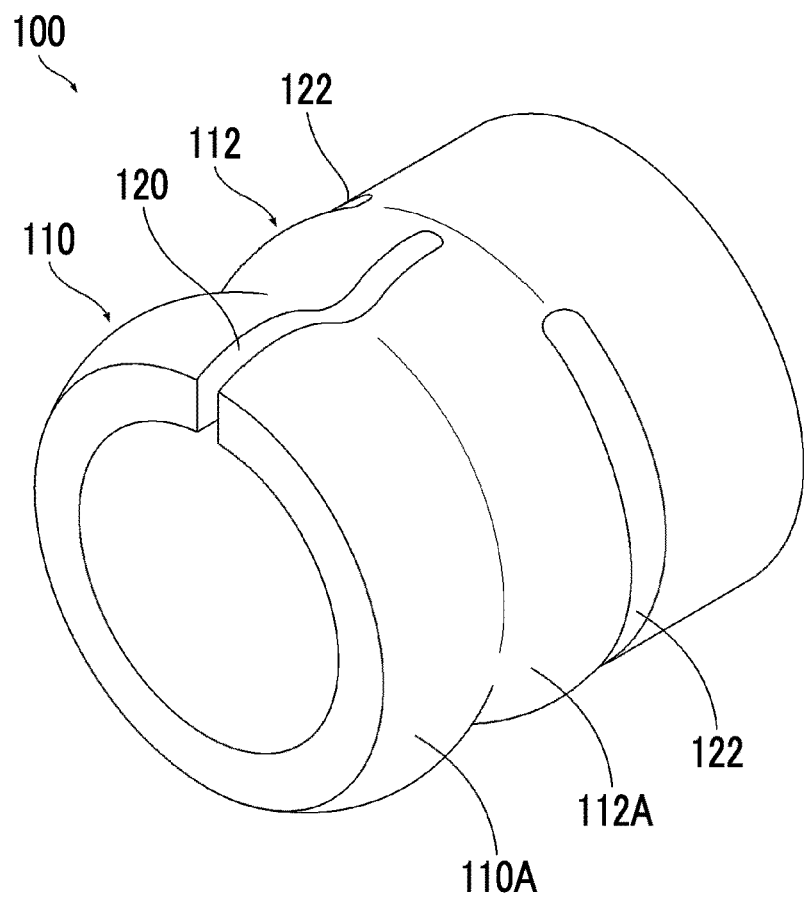
FIG. 18 is a perspective view showing an example of a cam follower that comprises a first slit provided at one position on the peripheral surface thereof.
Figure 19:
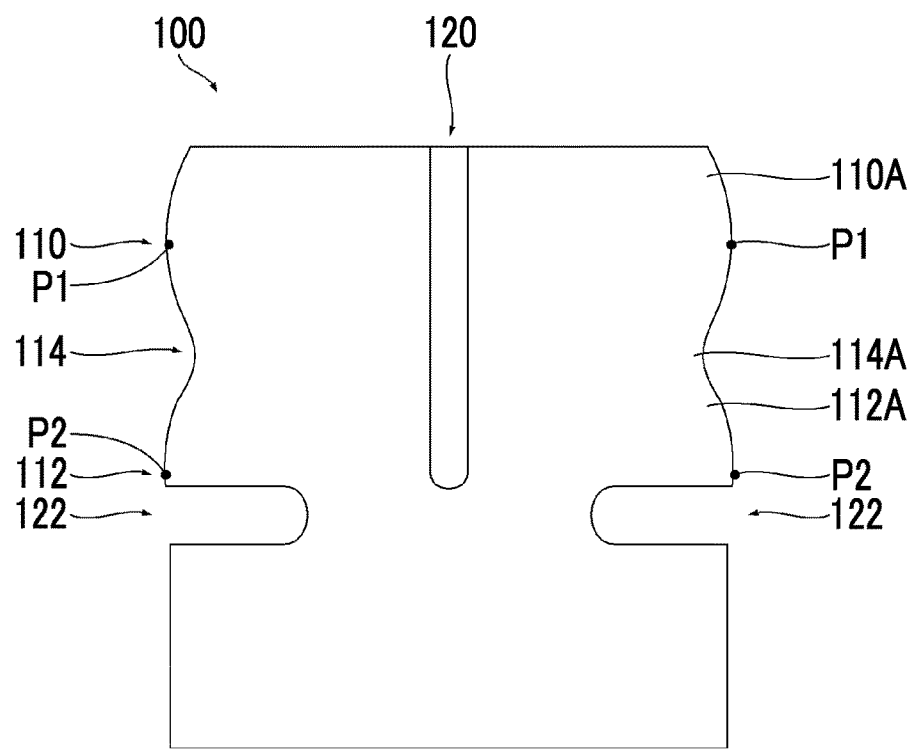
FIG. 19 is a front view of the cam follower shown in FIG. 18.
Figure 20:
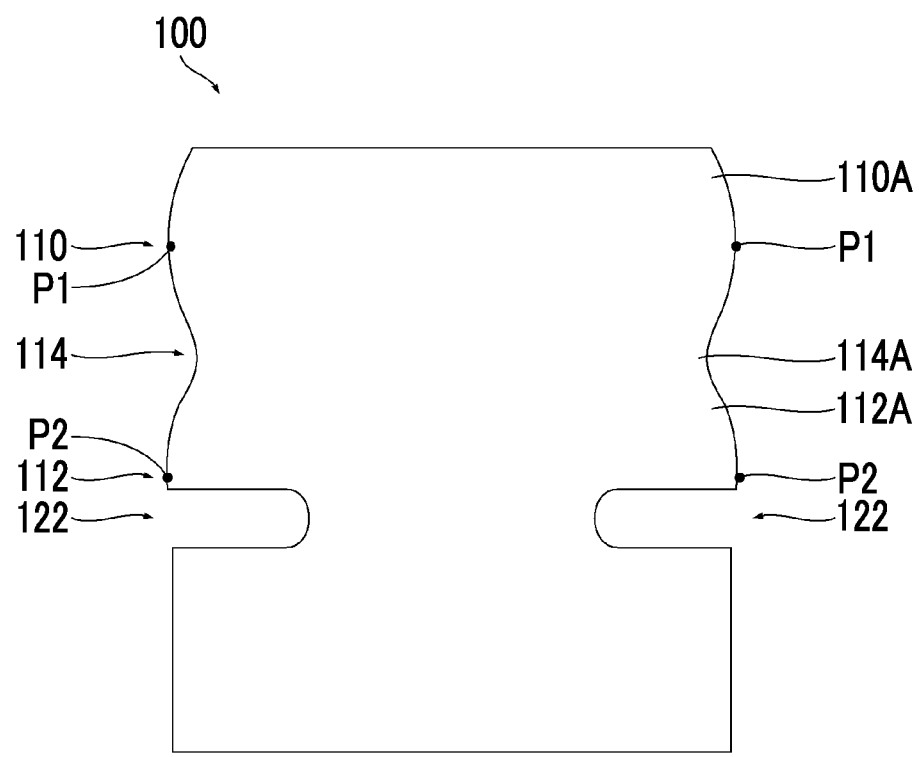
FIG. 20 is a rear view of the cam follower shown in FIG. 18.
Figure 21:
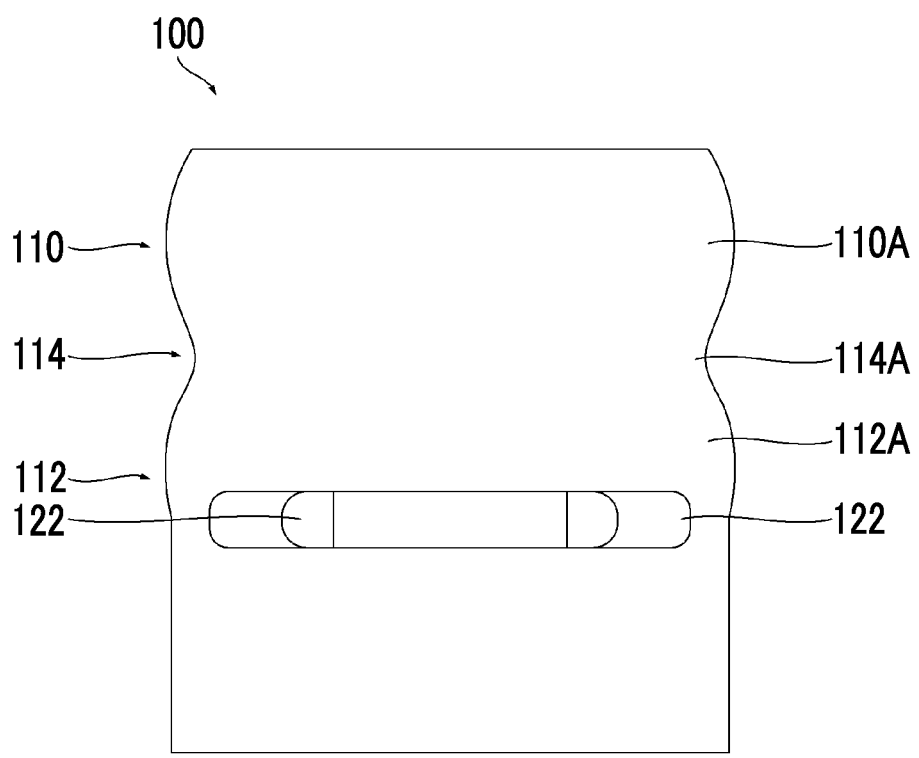
FIG. 21 is a left side view of the cam follower shown in FIG. 18.
Figure 22:
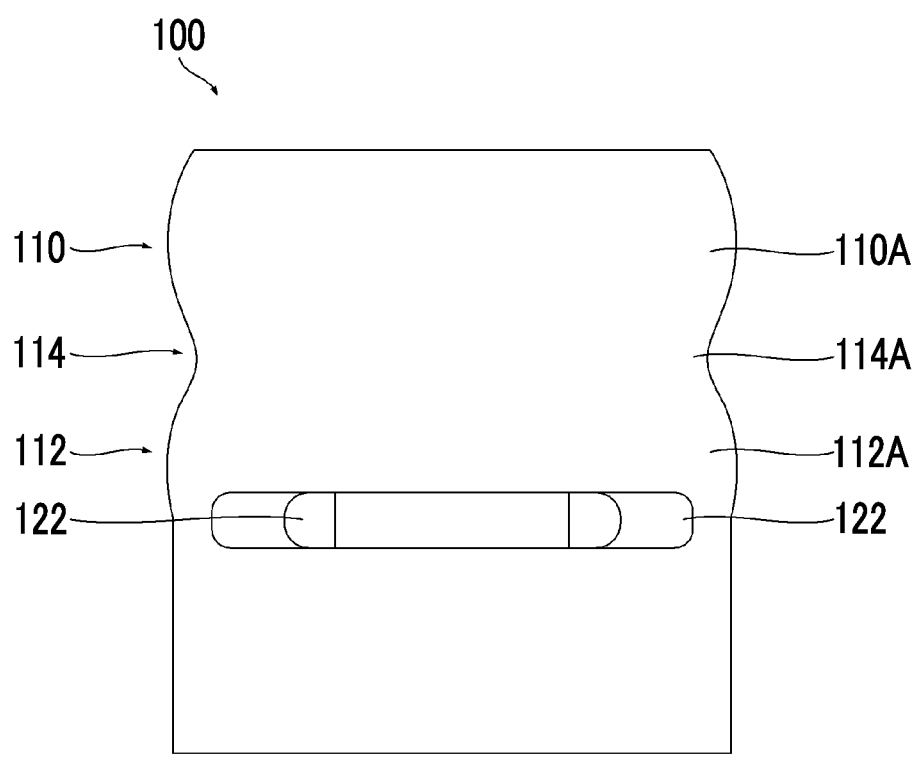
FIG. 22 is a right side view of the cam follower shown in FIG. 18.
Figure 23:
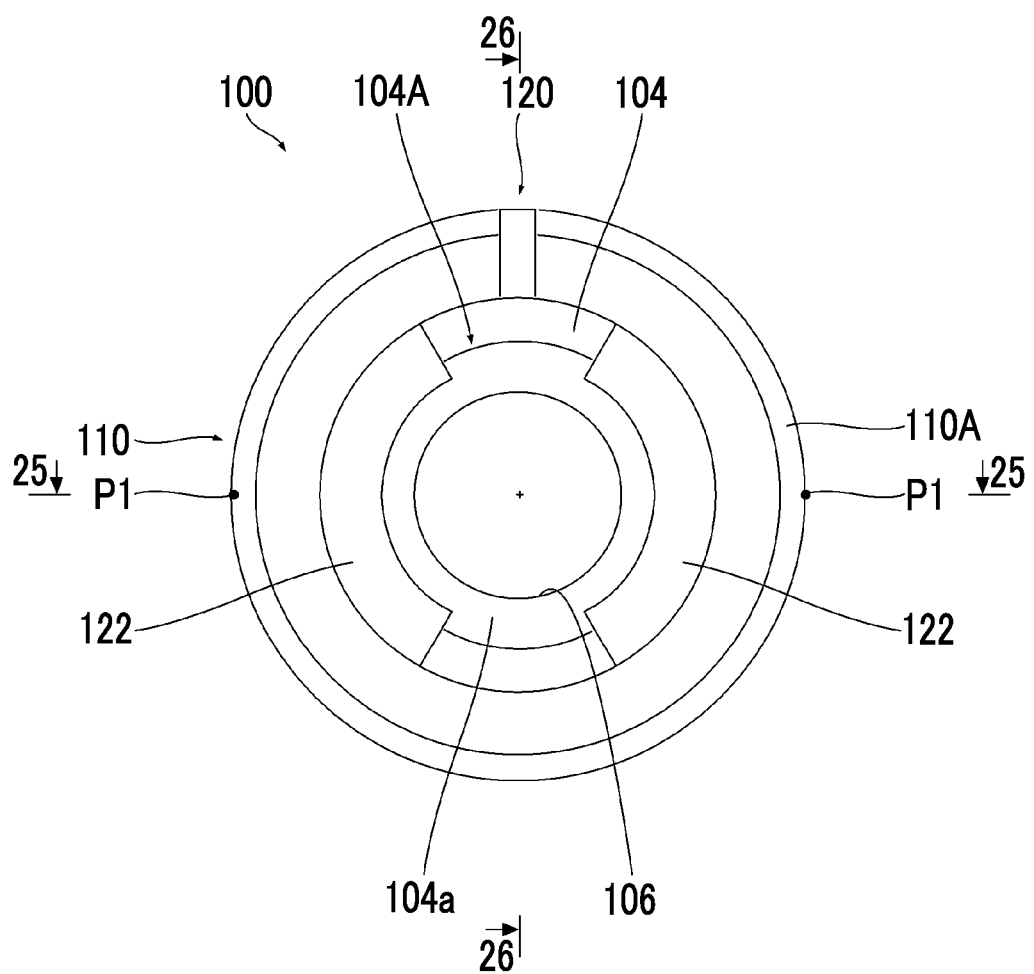
FIG. 23 is a plan view of the cam follower shown in FIG. 18.
Figure 24:
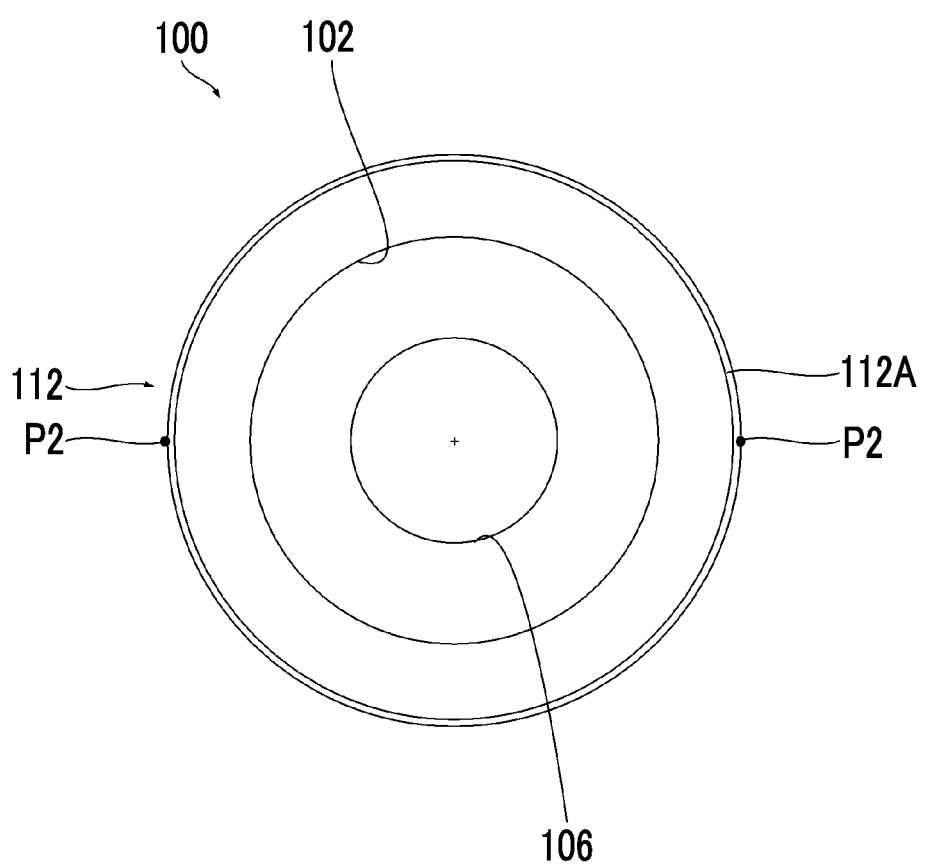
FIG. 24 is a bottom view of the cam follower shown in FIG. 18.
Figure 25:
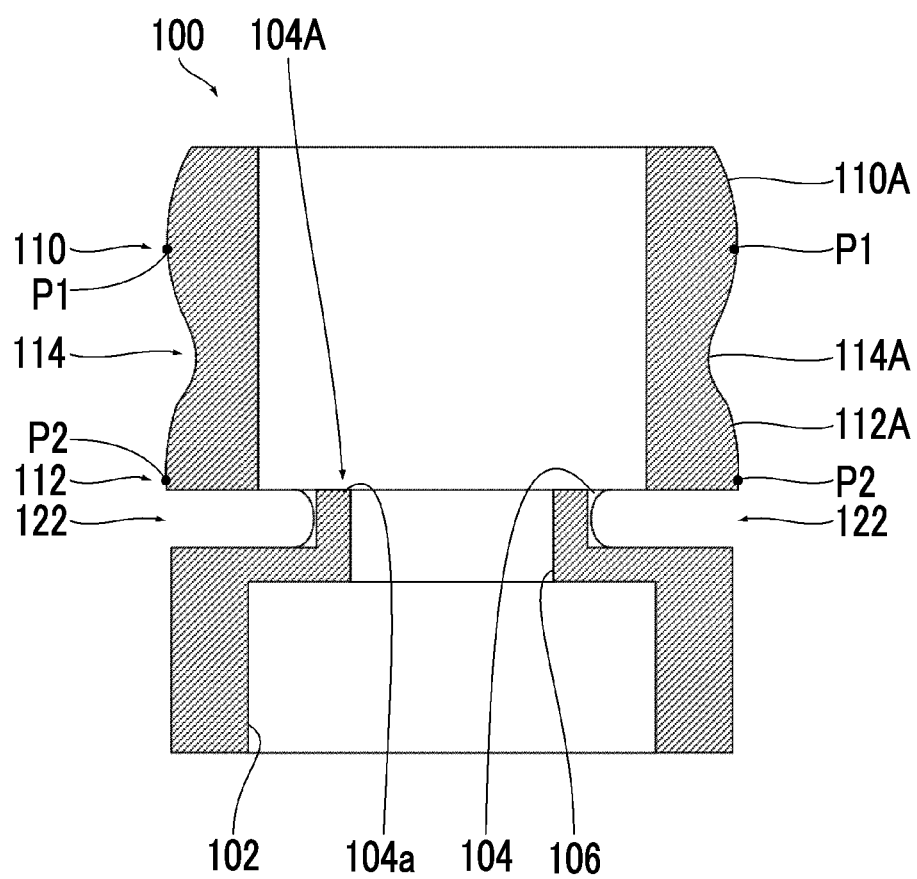
FIG. 25 is a cross-sectional view taken along line 25-25 of FIG. 23.
Figure 26:
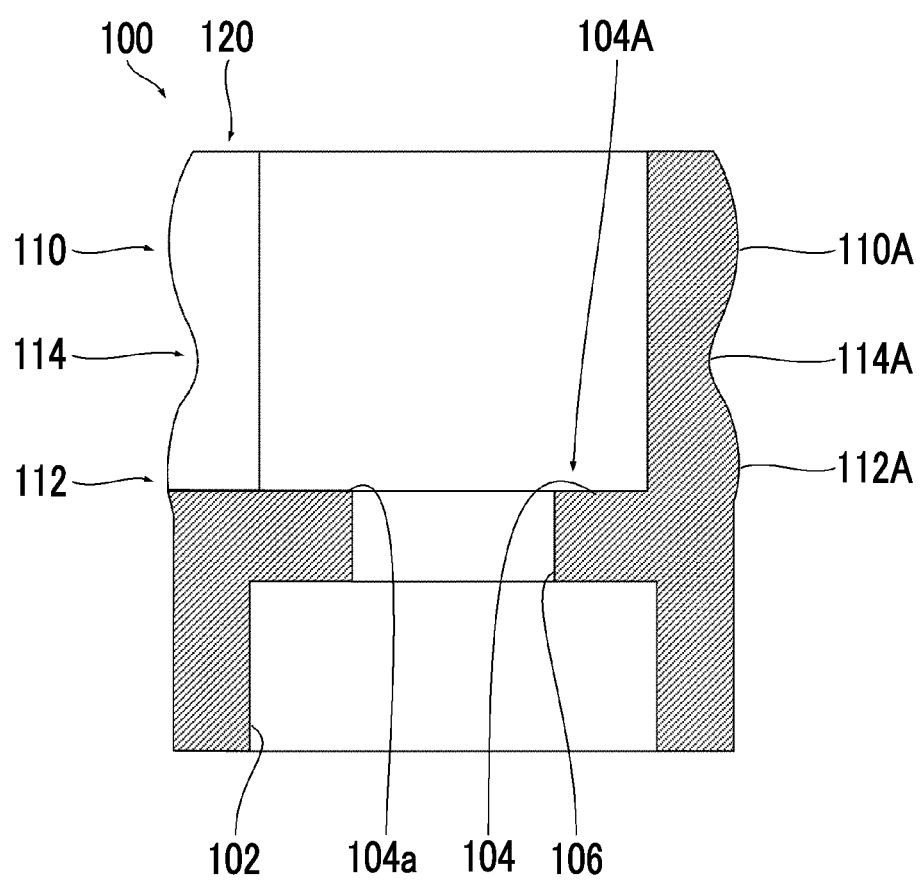
FIG. 26 is a cross-sectional view taken along line 26-26 of FIG. 23.

FIG. 18 is a perspective view showing an example of a cam follower that comprises a first slit provided at one position on the peripheral surface thereof. Further, FIGS. 19 to 24 are a front view, a rear view, a left side view, a right side view, a plan view, and a bottom view of the cam follower shown in FIG. 18, respectively. Furthermore, FIG. 25 is a cross-sectional view taken along line 25-25 of FIG. 23 and FIG. 26 is a cross-sectional view taken along line 26-26 of FIG. 23.

A cam follower of a modification example has the same structure as the cam follower 100 according to the embodiment except that a first slit 120 is provided at only one position on the peripheral surface of the cam follower. Accordingly, second slits 122 are provided at two positions in the circumferential direction. The two second slits 122 are arranged on the same circumference, and are arranged so as to be symmetric with respect to a straight line passing through the center of the cam follower 100 and the first slit 120.

Even in a case where the first slit 120 is provided at only one position in the circumferential direction, the first fitting portion 110 and the second fitting portion 112 can be elastically deformed in a radial direction.

In a case where the first slits 120 are to be provided at a plurality of positions in the circumferential direction, it is preferable that the respective first slits 120 are arranged at regular intervals. For example, in a case where first slits 120 are to be provided at four positions in the circumferential direction, it is preferable that the first slits 120 are arranged in the shape of a cross.

It is preferable that the first slits 120 are arranged in consideration of the amount of elastic deformation required for the first fitting portion 110 and the second fitting portion 112, the strength of the entire cam follower, and the like.

<Modification Example of Second Slit>

The second slits 122 have been provided at two positions in the circumferential direction in the embodiment, but an aspect where the second slits 122 are installed is not limited thereto.

As in the case of the first slits 120, it is preferable that the second slits 122 are arranged in consideration of the amount of elastic deformation required for the first fitting portion 110 and the second fitting portion 112, the strength of the entire cam follower, and the like.

In a case where a plurality of first slits 120 are to be provided, it is preferable that the second slit 122 is disposed between the first slits 120 adjacent to each other as in the embodiment. Accordingly, the respective regions, which are divided in the circumferential direction by the first slits 120, can be appropriately elastically deformed. Further, the influence of the respective divided regions on the press-fitting portion 102 can be appropriately reduced.

In a case where the first slits 120 are cut in up to the bottom 104 of the inner peripheral portion, the second slits 122 and the first slit 120 may be disposed close to each other. In this case, it is preferable that the second slits 122 are arranged in the following manner. That is, the second slits 122 are arranged so that a length L in the circumferential direction between the end portion of the second slit 122 and the first slit 120 at the position where the second slit 122 is disposed is in the range of 10% to 20% of the entire circumference (the circumference at a position where the second slit 122 is disposed) as shown in FIG. 4. Generally, the outer diameter of a cam follower of a lens device used for a projector, a camera, or the like is in the range of 3 mm to 10 mm. In a case where the above-mentioned condition is satisfied in the cam follower having this size, the first slits 120 and the second slits 122 can be appropriately arranged while sufficient strength is ensured.

<<Modification Example of Structure for Mounting Cam Follower>>

A structure for press-fitting the boss 212 to the press-fitting portion 102 and fastening the cam follower 100 by the cam follower-fixing screw 220 has been described in the embodiment, but a structure for mounting the cam follower 100 on the movable barrel is not limited thereto. A structure for mounting the cam follower on the movable barrel by merely press-fitting the boss 212 to the press-fitting portion 102 may be employed. That is, a structure for mounting the cam follower on the movable barrel by merely press-fitting without screwing may be employed.

Further, the press-fitting portion 102 has been formed of a recessed portion in the embodiment, but can also be formed of a protruding portion. In this case, the movable barrel is provided with a recessed portion.

Figure 27:
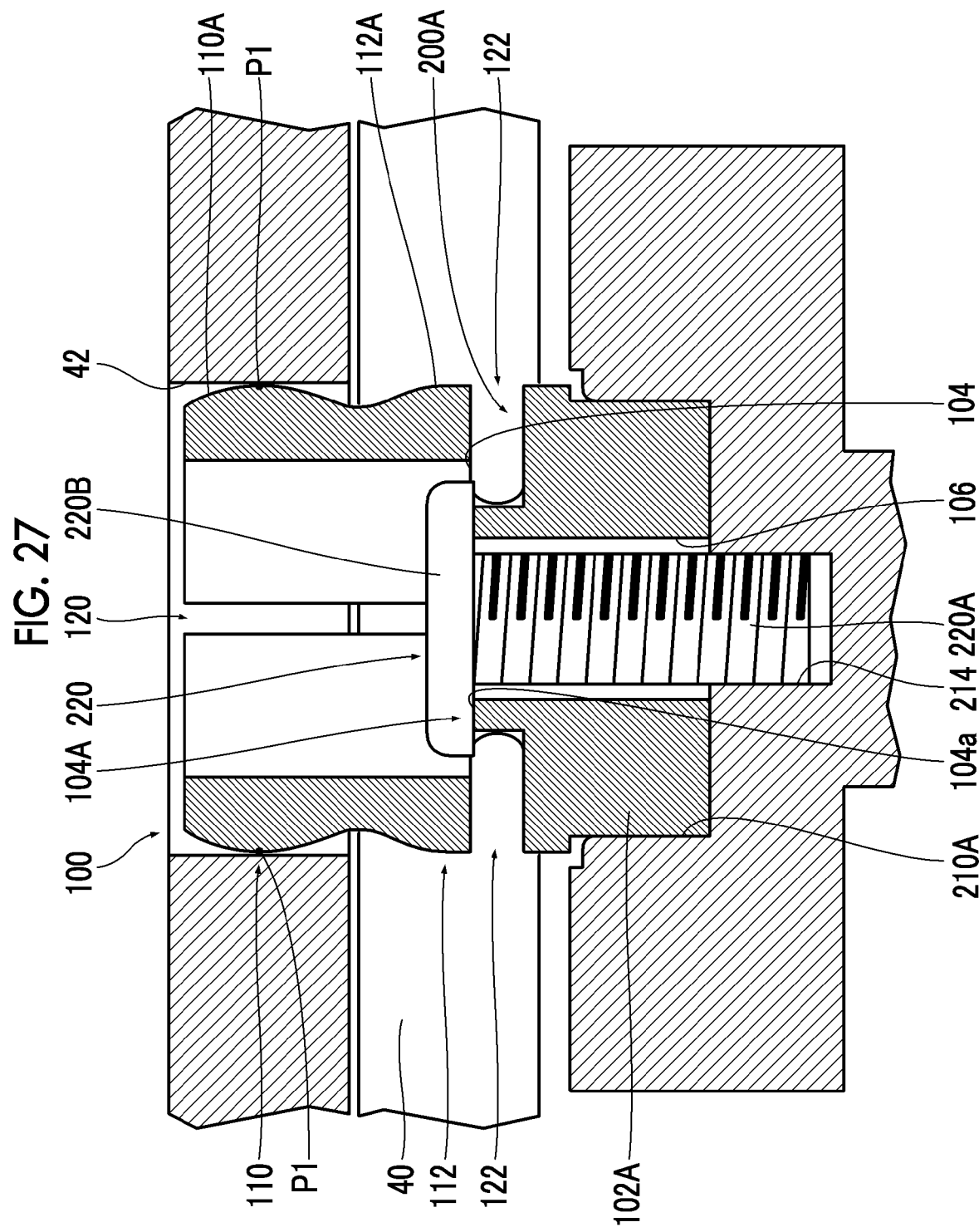
FIG. 27 is a cross-sectional view showing the structure of a cam follower-mounting portion of a cam follower of which a press-fitting portion is formed of a protruding portion.

FIG. 27 is a cross-sectional view showing the structure of a cam follower-mounting portion of a cam follower of which a press-fitting portion is formed of a protruding portion. FIG. 27 shows the structure of a cam follower-mounting portion of a second lens group-holding barrel 28.

As shown in FIG. 27, a cam follower 100 includes a press-fitting portion 102A that is provided at the proximal end portion thereof and is formed of a protruding portion. The press-fitting portion 102A has a columnar shape.

A cam follower-mounting portion 200A includes a recessed portion 210A to which the press-fitting portion 102A of the cam follower 100 is to be press-fitted. The recessed portion 210A has a shape corresponding to the shape of the press-fitting portion 102A, and has a circular shape. The inner diameter of the recessed portion 210 is slightly smaller than the outer diameter of the press-fitting portion 102A. Accordingly, in a case where the press-fitting portion 102A is fitted to the recessed portion 210A, the proximal end portion of the cam follower 100 is fixed to the cam follower-mounting portion 200A by so-called interference fit.

The press-fitting portion 102A is adapted to have a diameter smaller than the diameter s of the first fitting portion 110 and the second fitting portion 112 in the example shown in FIG. 27, but can also be adapted to have a diameter larger than the diameters of the first fitting portion 110 and the second fitting portion 112. Further, the press-fitting portion 102A can also be adapted to have substantially the same diameter as the diameter s of the first fitting portion 110 and the second fitting portion 112.

Further, the press-fitting portion 102A does not necessarily need to have a columnar shape, and may have the shape of a rectangular column and the like. The same applies to a case where the press-fitting portion is formed of a recessed portion.

<<Preferred Mounting Attitude of Cam Follower>>

Figure 28:
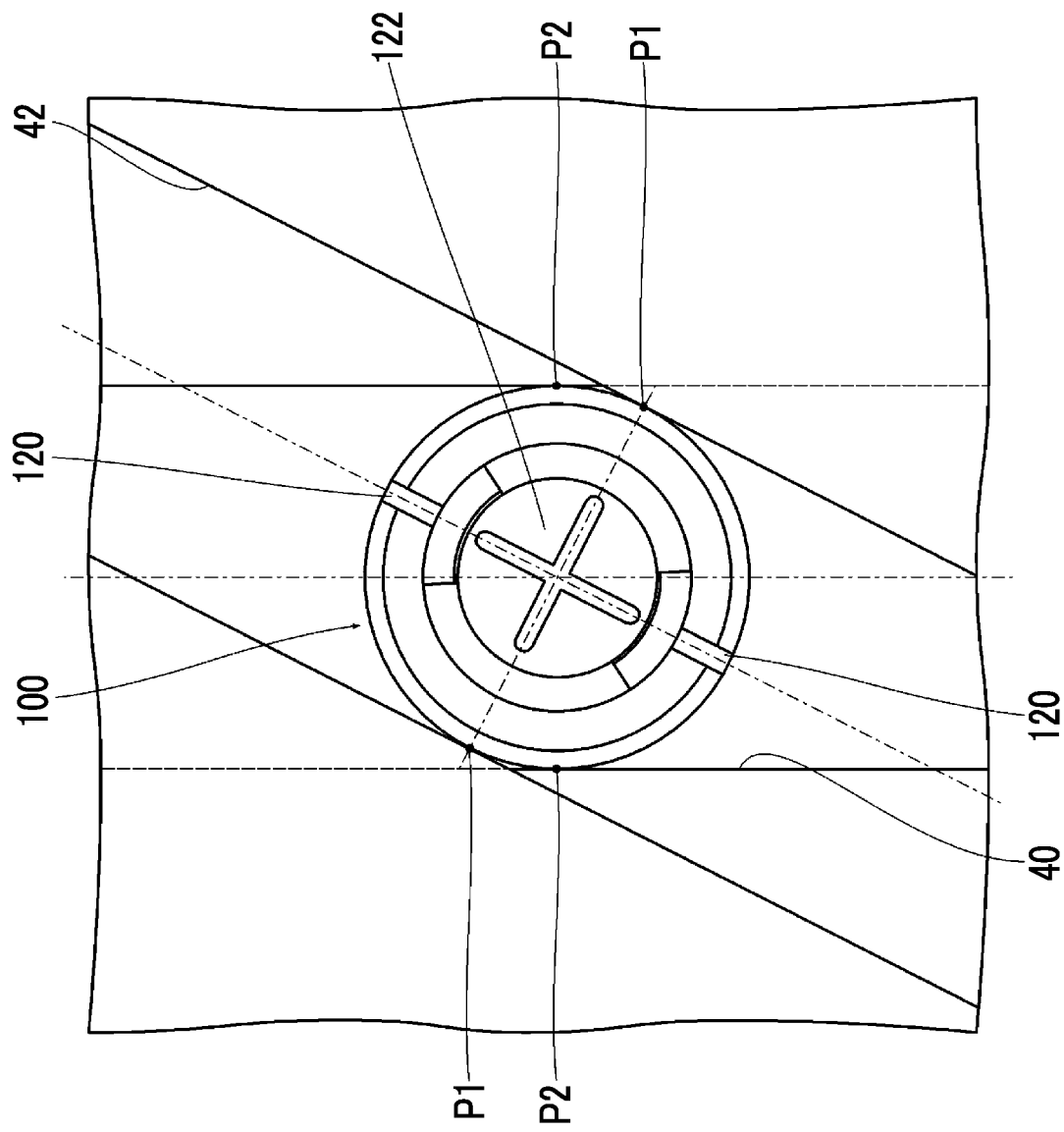
FIG. 28 is a diagram showing the preferred mounting attitude of the cam follower.

FIG. 28 is a diagram showing the preferred mounting attitude of the cam follower. FIG. 28 shows the preferred mounting attitude of the cam follower 100 of the second lens group-holding barrel 28, but it is preferable that the cam follower 100 is also mounted on the third lens group-holding barrel 30 and the fourth lens group-holding barrel 32 in the same manner.

As shown in FIG. 28, it is preferable that the cam follower 100 is positioned and mounted on the second lens group-holding barrel 28 so that the first slits 120 of the cam follower 100 are positioned substantially in the middle of the width of the second lens group-moving cam groove 42. In this case, the cam follower 100 is mounted so that a straight line passing through the two first slits 120 is substantially parallel to the second lens group-moving cam groove 42.

In a case where the cam follower 100 is mounted in this way, elasticity can be efficiently used. That is, the cam follower 100 can be substantially equally bent against both the inner wall surfaces of the cam groove. Accordingly, even though the rotary barrel 24 is rotated in any direction, the rotary barrel 24 can be rotated with the same force.

<<Modification Example of External Shape of Cam Follower>>

The external shape of the cam follower 100 has been a cylindrical shape in the embodiment, but is not limited thereto. The cam follower 100 has only to include at least an open distal end and to have a hollow shape. Accordingly, the shape of the outer periphery (the external shape of the cross section) of the cam follower 100 does not necessarily need to be a circular shape and may be, for example, an elliptical shape, a rounded rectangular shape, or the like.

Figure 29:
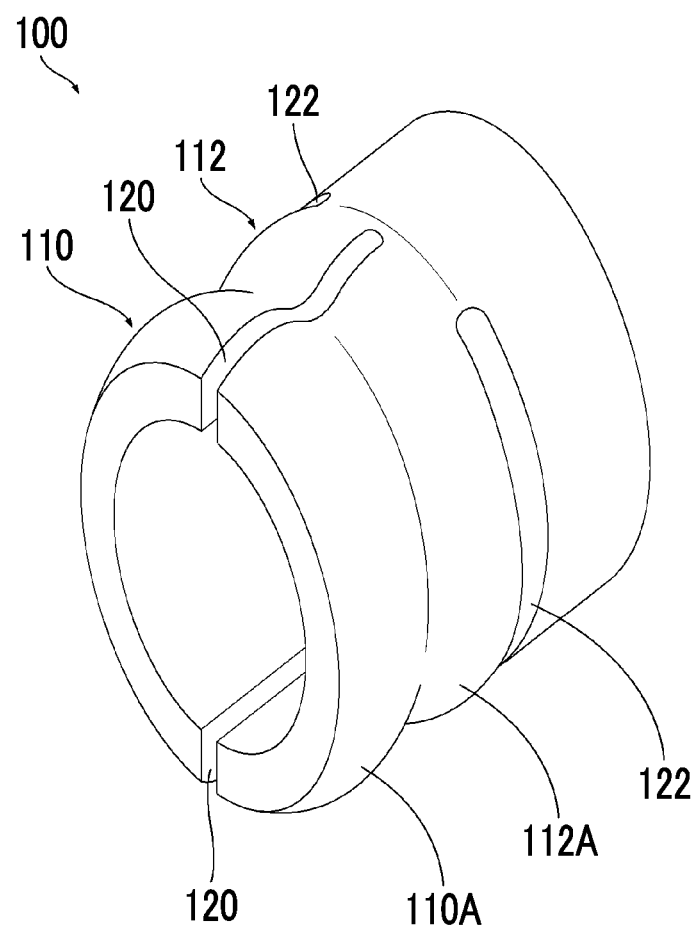
FIG. 29 is a perspective view showing an example of a cam follower having an elliptical shape.

FIG. 29 is a perspective view showing an example of a cam follower having an elliptical shape.

In the example shown in FIG. 29, first slits 120 are arranged at positions where the major axis of an ellipse and the peripheral surface of a cam follower 100 cross each other.

Further, the first fitting portion 110 and the second fitting portion 112 have had the same diameter in the embodiment, and the reason for this is that the cam groove and the straight groove to which the cam follower 100 is to be fitted have the same width. Accordingly, in a case where the cam groove and the straight groove to which the cam follower 100 is to be fitted have different widths, the first fitting portion 110 and the second fitting portion 112 are adapted to have diameters corresponding to the widths of the grooves to which the cam follower 100 is to be fitted.

<<Manufacture of Cam Follower>>

It is preferable that the entire cam follower including the first slits and the second slits is manufactured by injection molding. Accordingly, the cam follower can be manufactured at a low cost.

<<Modification Example of Lens Barrel>>

The lens barrel 20 according to the embodiment has been adapted so that the rotary barrel 24 is disposed outside the stationary barrel 22, but may be adapted so that the rotary barrel 24 is disposed inside the stationary barrel 22. In this case, the first fitting portion 110 of the cam follower 100 is fitted to the straight groove and the second fitting portion 112 is fitted to the cam groove.

Further, the lens barrel 20 according to the embodiment has been adapted so that the stationary barrel 22 comprises the straight grooves and the rotary barrel 24 comprises the cam grooves, but may be adapted so that the stationary barrel comprises the cam grooves and the rotary barrel comprises the straight grooves. That is, the barrel (first barrel) including the cam grooves and the barrel (second barrel) including the straight grooves have only to be adapted to rotate relative to each other.

Furthermore, the lens device 1 of the embodiment has been adapted so that the rotary barrel 24 is rotated by a motor, but may be adapted so that the rotary barrel 24 is manually rotated.

<<Application to Other Lens Devices>>

A case where the invention is applied to the lens device used for a projector has been described in the embodiment by way of example, but the application of the invention is not limited thereto. Further, the invention can also be applied to a lens device used for a camera. Furthermore, the type of camera to which the invention is to be applied is also not particularly limited, and the invention can be applied to various cameras, such as a silver salt camera, a digital camera, a television camera, a cinema camera, and a security camera. Moreover, a lens device applied to a camera can be formed as an interchangeable lens that can be attached to and detached from a camera body.

Further, a case where the invention is applied to the lens device for moving the lens group for zoom by a cam mechanism has been described in the embodiment by way of example, but the invention can also be applied to a lens device for moving a lens group for focus by a cam mechanism likewise.

EXPLANATION OF REFERENCES

1: lens device
10: optical system
20: lens barrel
22: stationary barrel
22A: helicoid gear portion
22B: fifth lens group-holding barrel-mounting portion
24: rotary barrel
24A: gear portion
26: first lens group-holding barrel
26A: helicoid gear portion
28: second lens group-holding barrel
30: third lens group-holding barrel
32: fourth lens group-holding barrel
34: fifth lens group-holding barrel
40: straight groove
42: second lens group-moving cam groove
44: third lens group-moving cam groove
46: fourth lens group-moving cam groove
100: cam follower
102: press-fitting portion
102A: press-fitting portion
104: bottom of inner peripheral portion
104A: seat surface portion
104a: seat surface
106: through-hole
110: first fitting portion
110A: outer peripheral surface
112: second fitting portion
112A: outer peripheral surface
114: constricted portion
114A: outer peripheral surface
120: first slit
122: second slit
122a: inner wall surface
200: cam follower-mounting portion
200A: cam follower-mounting portion
210: recessed portion
210A: recessed portion
212: boss
214: threaded hole
220: cam follower-fixing screw 220A: screw portion
220B: head portion
G1: first lens group
G2: second lens group
G3: third lens group
G4: fourth lens group
G5: fifth lens group
L: optical axis
P1: cam groove-contact portion
P2: straight groove-contact portion
d: distance

What is claimed is:

1. A lens barrel comprising:
a first barrel including a cam groove;
a second barrel including a straight groove;
a movable barrel that is disposed in the first barrel and the second barrel; and
a cam follower which is provided on the movable barrel and has a hollow shape and of which a distal end to be fitted to the straight groove and the cam groove is open,
wherein the movable barrel is moved along an optical axis by relative rotation of the first barrel and the second barrel,
the cam follower includes a press-fitting portion that is provided at a proximal end portion thereof and is to be press-fitted to a protruding portion or a recessed portion provided on the movable barrel,
a surface of the cam follower to be in contact with an inner wall surface of the cam groove and a surface of the cam follower to be in contact with an inner wall surface of the straight groove have an arc shape convex toward an outside,
the cam follower includes a first slit that is cut in from the distal end toward a proximal end thereof in parallel to an axis and a second slit that is cut in from an outer peripheral portion of the cam follower toward an inner peripheral portion thereof so as to be orthogonal to the axis, and
the second slit is disposed at a position that is closer to the proximal end than a portion of the cam follower to be in contact with the inner wall surface of the cam groove and a portion of the cam follower to be in contact with the inner wall surface of the straight groove and is closer to the distal end than the press-fitting portion, and penetrates the inner peripheral portion.

2. The lens barrel according to claim 1,
wherein end portions of the first slit and the second slit have a round shape.

3. The lens barrel according to claim 1,
wherein the cam follower includes the first slits provided at a plurality of positions at regular intervals in a circumferential direction.

4. The lens barrel according to claim 3,
wherein the cam follower includes the first slits arranged at two positions in the circumferential direction.

5. The lens barrel according to claim 4,
wherein the first slit of the cam follower mounted on the movable barrel is positioned in a middle portion of a width of the cam groove.

6. The lens barrel according to claim 3,
wherein the cam follower includes the second slit disposed between the first slits adjacent to each other.

7. The lens barrel according to claim 6,
wherein a length in the circumferential direction between an end portion of the second slit and the first slit is in a range of 10% to 20% of an entire circumference.

8. The lens barrel according to claim 1,
wherein the cam follower includes a through-hole that is provided in a bottom of the inner peripheral portion and is parallel to the axis, a fastening member passes through the through-hole from the inner peripheral portion, and the cam follower is fixed to the movable barrel by the fastening member.

9. The lens barrel according to claim 8,
wherein at least a surface of the bottom of the inner peripheral portion of the cam follower, which is to be in contact with the fastening member, is positioned closer to the proximal end than a distal end-side inner wall surface of the second slit.

10. The lens barrel according to claim 9,
wherein the first slit of the cam follower is cut in up to the bottom of the inner peripheral portion.

11. A cam follower, which is provided on a movable barrel and has a hollow shape and of which a distal end to be fitted to a straight groove provided in a first barrel and a cam groove provided in a second barrel is open, in a lens barrel that moves the movable barrel disposed in the first barrel and the second barrel along an optical axis by relative rotation of the first barrel and the second barrel, the cam follower comprising:
a press-fitting portion that is provided at a proximal end portion thereof and is to be press-fitted to a protruding portion or a recessed portion provided on the movable barrel;
a surface to be in contact with an inner wall surface of the cam groove and a surface to be in contact with an inner wall surface of the straight groove that have an arc shape convex toward an outside; and
a first slit that is cut in from the distal end toward a proximal end thereof in parallel to an axis and a second slit that is cut in from an outer peripheral portion of the cam follower toward an inner peripheral portion thereof so as to be orthogonal to the axis,
wherein the second slit is disposed at a position that is closer to the proximal end than a portion of the cam follower to be in contact with the inner wall surface of the cam groove and a portion of the cam follower to be in contact with the inner wall surface of the straight groove and is closer to the distal end than the press-fitting portion, and penetrates the inner peripheral portion.

* * * * *